(12) United States Patent
Chong, Jr.

(10) Patent No.: US 7,234,022 B2
(45) Date of Patent: Jun. 19, 2007

(54) CACHE ACCUMULATOR MEMORY FOR PERFORMING OPERATIONS ON BLOCK OPERANDS

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 643 days.

(21) Appl. No.: 10/027,359

(22) Filed: Dec. 19, 2001

(65) Prior Publication Data

US 2003/0115418 A1 Jun. 19, 2003

(51) Int. Cl.
*G06F 13/00* (2006.01)

(52) U.S. Cl. .................... 711/113; 711/131

(58) Field of Classification Search ........... 711/126, 711/131, 118, 113
See application file for complete search history.

(56) References Cited

U.S. PATENT DOCUMENTS

| | | | | |
|---|---|---|---|---|
| 4,888,679 | A | * | 12/1989 | Fossum et al. .......... 712/6 |
| 5,146,588 | A | * | 9/1992 | Crater et al. ............ 714/6 |
| 5,392,425 | A | | 2/1995 | Elliott et al. |
| 5,412,671 | A | | 5/1995 | Tsuchiya |
| 5,590,307 | A | * | 12/1996 | McClure ............... 711/131 |
| 5,701,438 | A | | 12/1997 | Bains |
| 5,896,406 | A | | 4/1999 | Berry et al. |
| 6,052,822 | A | | 4/2000 | Kim et al. |
| 6,088,783 | A | * | 7/2000 | Morton .................. 712/22 |
| 6,122,708 | A | * | 9/2000 | Faraboschi et al. ..... 711/118 |
| 6,148,368 | A | | 11/2000 | DeKoning |
| 6,216,218 | B1 | * | 4/2001 | Sollars ................ 712/201 |
| 6,262,748 | B1 | | 7/2001 | Deering et al. |
| 6,694,475 | B1 | | 2/2004 | Saito |
| 2001/0013103 | A1 | | 8/2001 | Yamamoto |
| 2002/0095642 | A1 | | 7/2002 | Karim et al. |
| 2004/0083420 | A1 | | 4/2004 | Oldfield et al. |

OTHER PUBLICATIONS

Jim Handy, "The Cache Memory Book: the authoritative reference on cache design," second edition, Academic Press, 1993, pp. 57, and 64-65.*
"Microsoft Computer Dictionary," Fifth edition, Microsoft Press, 2002, p. 391.*
National Instruments, "Dual-Port Memory," 2004, 1 page.
Webster's Online Dictionary, "Random Access Memory," 2 pages.

* cited by examiner

*Primary Examiner*—Pierre Bataille
*Assistant Examiner*—Sheng-Jen Tsai
(74) *Attorney, Agent, or Firm*—Robert C. Kowert; Meyertons, Hood, Kivlin, Kowert & Goetzel, P.c.

(57) ABSTRACT

Various embodiments of systems and methods for performing accumulation operations on block operands are disclosed. In one embodiment, an apparatus may include a memory, a functional unit that performs an operation on block operands, and a cache accumulator. The cache accumulator is configured to provide a block operand to the functional unit and to store the block result generated by the functional unit. The cache accumulator is configured to provide the block operand to the functional unit in response to an instruction that uses an address in the memory to identify the block operand. Thus, the cache accumulator behaves as both a cache and an accumulator.

30 Claims, 18 Drawing Sheets

| Instructions | Acc. Memory 27A | Acc. Memory 27B | Memory 15 |
|---|---|---|---|
| B = B0 | B(new) | n/a | B0 |
| B = B XOR B1 | B(old) | B(new) | B1 |
| B = B XOR B2 | B(new) | B(old) | B2 |
| B = B XOR B3 | B(old) | B(new) | B3 |
| B = B XOR B4 | B(new) | B(old) | B4 |
| flush cache | n/a | n/a | B |

FIG. 6

| Instructions | Acc. Memory 27A | Acc. Memory 27B | Memory 15 |
|---|---|---|---|
| B = immed(B0) | B(new) | n/a | n/a |
| B = B XOR immed(B1) | B(old) | B(new) | n/a |
| B = B XOR immed(B2) | B(new) | B(old) | n/a |
| B = B XOR immed(B3) | B(old) | B(new) | n/a |
| B = B XOR immed(B4) | B(new) | B(old) | n/a |
| flush cache | n/a | n/a | B |

FIG. 7

Accumulation Operations:

B = B0 XOR B1 XOR B2 XOR B3 XOR B4
C = C0 XOR C1 XOR C2 XOR C3 XOR C4
D = D0 XOR D1 XOR D2 XOR D3 XOR D4

Instructions:

(1)   B = B0
(2)   B = B XOR B1
(3)   B = B XOR B2
(4)   C = C0
(5)   C = C XOR C1
(6)   C = C XOR C2
(7)   B = B XOR B3
(8)   D = D0
(9)   D = D XOR D1
(10)  D = D XOR D2
(11)  C = C XOR C3
(12)  D = D XOR D3
(13)  B = B XOR B4
(14)  C = C XOR C4
(15)  D = D XOR D4

*FIG. 8A*

| Row# | Instructions/Operations | Acc. Memory 27A | Acc. Memory 27B | Memory 15 |
|---|---|---|---|---|
| 1 | (1)  B = B0 | B(new) | n/a | B0 |
| 2 | (2)  B = B XOR B1 | B(old) | B(new) | B1 |
| 3 | (3)  B = B XOR B2 | B(new) | B(old) | B2 |
| 4 | (4)  C = C0 | C(new) | n/a | C0 |
| 5 | (5)  C = C XOR C1 | C(old) | C(new) | C1 |
| 6 | (6)  C = C XOR C2 | C(new) | C(old) | C2 |
| 7 | (7)  B = B XOR B3 | B(old) | B(new) | B3 |
| 8 | (8)  D = D0 | n/a | n/a | n/a |
| 9 | (8)  flush C | C | n/a | C |
| 10 | (8)  load D | D(new) | n/a | D0 |
| 11 | (9)  D = D XOR D1 | D(old) | D(new) | D1 |
| 12 | (10)  D = D XOR D2 | D(new) | D(old) | D2 |
| 13 | (11)  C = C XOR C3 | n/a | n/a | n/a |
| 14 | (11)  flush B | n/a | B | B |
| 15 | (11)  load C | n/a | C(new) | C |
| 16 | (11 completes) | C(new) | C(old) | C3 |
| 17 | (12)  D = D XOR D3 | D(old) | D(new) | D3 |
| 18 | (13)  B = B XOR B4 | n/a | n/a | n/a |
| 19 | (13)  flush C | C | n/a | C |
| 20 | (13)  load B | B(new) | n/a | B |
| 21 | (13 completes) | B(old) | B(new) | B4 |
| 22 | flush B | n/a | B | B |
| 23 | (14)  C = C XOR C4 | n/a | n/a | n/a |
| 24 | (14)  load C | n/a | C(new) | C |
| 25 | (14 completes) | C(new) | C(old) | C4 |
| 26 | flush C | C | n/a | C |
| 27 | (15)  D = D XOR D4 | D(new) | D(old) | D4 |
| 28 | flush cache | D | n/a | D |

*FIG. 8B*

Accumulation Operation:
D = A XOR B XOR C

Instruction 1:
Write_Allocate(A)

Instruction 2:
XOR_Write(A,B,D)

Instruction 3:
XOR_Write(D,C,D)

Instruction 4:
Read_Deallocate(D)

Accumulation Operation:
D = A XOR B XOR C

Instruction 1:
Write_Allocate(A)

All block storage locations are allocated; W is flushed to memory

Instruction 2:
XOR_Write(A,B,D)

Instruction 3:
XOR_Write(D,C,D)

Instruction 4:
Read_Deallocate(D)

Instruction 1:
Write_Allocate(A)

Instruction 2:
XOR_Write(A,B,D)

D is flushed to memory.

Instruction 3:
XOR_Write(D,C,D)

After D has been loaded into the cache accumulator, instruction 3 is executed.

Accumulation Operation:
D = A XOR B XOR C

CACHE ACCUMULATOR MEMORY FOR PERFORMING OPERATIONS ON BLOCK OPERANDS

BACKGROUND OF THE INVENTION

1. Field of the Invention

This invention relates to performing operations on block operands.

2. Description of the Related Art

Blocks of data are typically transmitted and/or processed as a single unit in a computer or network system. While block size is typically constant within any given system, different systems may have block sizes that range from a few bytes to several thousand bytes or more. There is a tendency for block size to increase with time, since advances in technology tend to allow larger units of data to be transmitted and processed as a single unit than was previously possible. Thus, an older system may operate on 32 byte blocks while a newer system may operate on 4 Kbyte blocks or larger.

In computer and network systems, many situations arise where it is useful to perform operations on blocks of data. For example, a RAID storage system that implements striping may calculate a parity block for each stripe. Each stripe may include several blocks of data, and the parity block for that stripe may be calculated by XORing all the blocks in that stripe. Another block operation may reconstruct a block that was stored on a failed device by XORing the parity block and the remaining blocks in the stripe. Similarly, in graphics processing, operations are often performed on multiple blocks of data.

Given the large amounts of data involved, block operations tend to consume large amounts of bandwidth. Returning to the parity example, if there are 5 blocks (B0–B4) of data in a particular stripe, the parity P for that stripe may equal B0 XOR B1 XOR B2 XOR B3 XOR B4. A RAID controller may be configured to calculate P using four instructions of the form A=A XOR Bn, where an accumulator A stores intermediate results:

(0) A=B0
(1) A=A XOR B1
(2) A=A XOR B2
(3) A=A XOR B3
(4) A=A XOR B4
(5) P=A

Note that in steps 1–4 of the example, the accumulator A stores both an operand and a result. Accordingly, performing each of these steps involves both a read from and a write to the accumulator. Furthermore, since the operands for each step are blocks of data, each step 1–4 may represent multiple sub-steps of byte or word XOR calculations (the size of the sub-step calculations may depend on the width of the functional unit performing the XOR calculation). For example, if each block is 4 Kbytes, step 1 may involve (a) receiving a word from the accumulator and a word of B1, (b) XORing the two words to get a result word, (c) overwriting the word received from the accumulator in step a with the result word, and (d) repeating a–c for the remaining words in block B1. As this example shows, performing a multi-block operation may involve alternating between a read and a write to the accumulator during each sub-step. Each of these reads and writes takes a certain amount of time to perform, and there may be an additional amount of time required to switch between read and write mode (e.g., time to precharge an output driver, etc.). Since each sub-step involves both a read and a write, the accumulator memory may not be able to keep up with the full bandwidth of the memory that is providing Bn unless the accumulator is capable of being accessed at least twice as fast as the memory storing Bn. If the accumulator cannot keep up with the memory that stores Bn, the accumulator will present a bottleneck.

One possible way to alleviate such an accumulator bottleneck is to include specialized components in the accumulator memory. For example, if a memory that can be read from and written to at least twice as fast as the source of Bn is used for the accumulator memory, the accumulator memory may be able to keep up with the Bn source. However, such a memory may be too expensive to be practical. Additionally, such an accumulator memory may be inefficient. Generally, operations that are performed on large groups of data may be inefficient if they frequently switch between reading and writing data. For example, instead of allowing data to be transmitted in bursts, where the costs of any setup and hold time and/or time required to switch between read and write mode are amortized over the entire burst, frequently switching between reads and writes may result in data being transmitted in smaller, less efficient units. Accordingly, if the multi-block operation is being performed one word at a time, it may be necessary to repeatedly alternate between reading from and writing to the accumulator, reducing the accumulator's efficiency. As a result of this inefficiency, the memory may need to be more than twice as fast as the source of the other operand to avoid presenting a bottleneck.

Another solution to the accumulator bottleneck problem may be to use a specialized memory such as a dual-ported VRAM (Video Random Access Memory) for the accumulator in order to increase the bandwidth of the operation. Dual-ported VRAM can be read from and written to in the same access cycle. This may alleviate the accumulator bottleneck and allow the block operation to be performed at the speed that operand B can be fetched from its source.

Another concern that may arise when using an accumulator is the inefficiency that may arise due to the involvement of a high-level controller (e.g., a CPU in an array controller) in the accumulation operation. If a high-level controller has to directly manage data movement to and from the accumulator, the overall efficiency of the system may be reduced.

SUMMARY

Various embodiments of systems and methods for performing accumulation operations on block operands are disclosed. In one embodiment, an apparatus may include a memory, a functional unit that performs an operation on block operands, and a cache accumulator. The cache accumulator is configured to provide a block operand to the functional unit and to store the block result generated by the functional unit. The cache accumulator is configured to provide the block operand to the functional unit in response to an instruction that uses an address in the memory to identify the block operand. Thus, the cache accumulator behaves as both a cache and an accumulator.

In some embodiments, the cache accumulator may include a dual-ported memory. In other embodiments, the cache accumulator may include two or more independently interfaced memory banks. The cache accumulator may be configured to provide the block operand from one of the independently interfaced memory banks and to store the block result in another one of the independently interfaced memory banks.

In one embodiment, a method of performing a block accumulation operation involves receiving a first command to perform an operation on a first block operand identified by a first address in a memory and, in response to receiving the first command, loading the first block operand from the memory into a cache accumulator if the first block operand is not already stored in the cache accumulator, providing the first block operand from the cache accumulator to a functional unit, and storing a block result of the operation generated by the functional unit into the cache accumulator.

One embodiment of a data processing system may include a host computer system, a storage array, an interconnect, and a parity calculation system. The interconnect may be coupled to the host computer system and the storage array and configured to transfer data between the host computer system and the storage array. The parity calculation system may be configured to perform parity operations on data stored to the storage array. The parity calculation system includes a memory, a cache accumulator, and a parity calculation unit. The cache accumulator is configured to output a first block operand to the parity calculation unit in response to an instruction using an address in the memory to identify the first block operand. The cache accumulator is further configured to store a first block result generated by the parity calculation unit.

In many embodiments, the parity calculation unit may be configured to perform a parity calculation on the first block operand provided by the cache accumulator and a second block operand provided on a data bus. The parity calculation system may be used to calculate a parity block from a plurality of data blocks in a stripe of data. The first block operand and second block operands may be two of the data blocks in the stripe of data.

In one embodiment, an apparatus includes means for storing data (e.g., like memory 15 in FIGS. 5 and 9), means for performing a block operation on one or more block operands to generate a block result (e.g., functional unit 25 in FIGS. 5 and 9), and means for storing the block result (e.g., cache accumulator 50 in FIG. 5 or cache accumulator 50A in FIG. 9). The means for storing the block result provide a block operand to the means for performing the block operation in response to an instruction that uses an address in the means for storing data to identify the block operand. The means for storing the block result are coupled to the means for storing the block result and the means for performing a block operation. The means for storing the block result may store a word of the block result during an access cycle in which the means for storing the block result provide a word of the block operand to the means for performing a block operation.

BRIEF DESCRIPTION OF THE DRAWINGS

A better understanding of the present invention can be obtained when the following detailed description is considered in conjunction with the following drawings, in which:

FIG. 6 shows an example of the contents of one embodiment of a cache accumulator in response to a series of instructions.

FIG. 7 shows another example of the contents of one embodiment of a cache accumulator in response to a series of instructions.

FIGS. 8A and 8B illustrate yet another example of the contents of one embodiment of a cache accumulator in response to a series of instructions.

Figure 1:
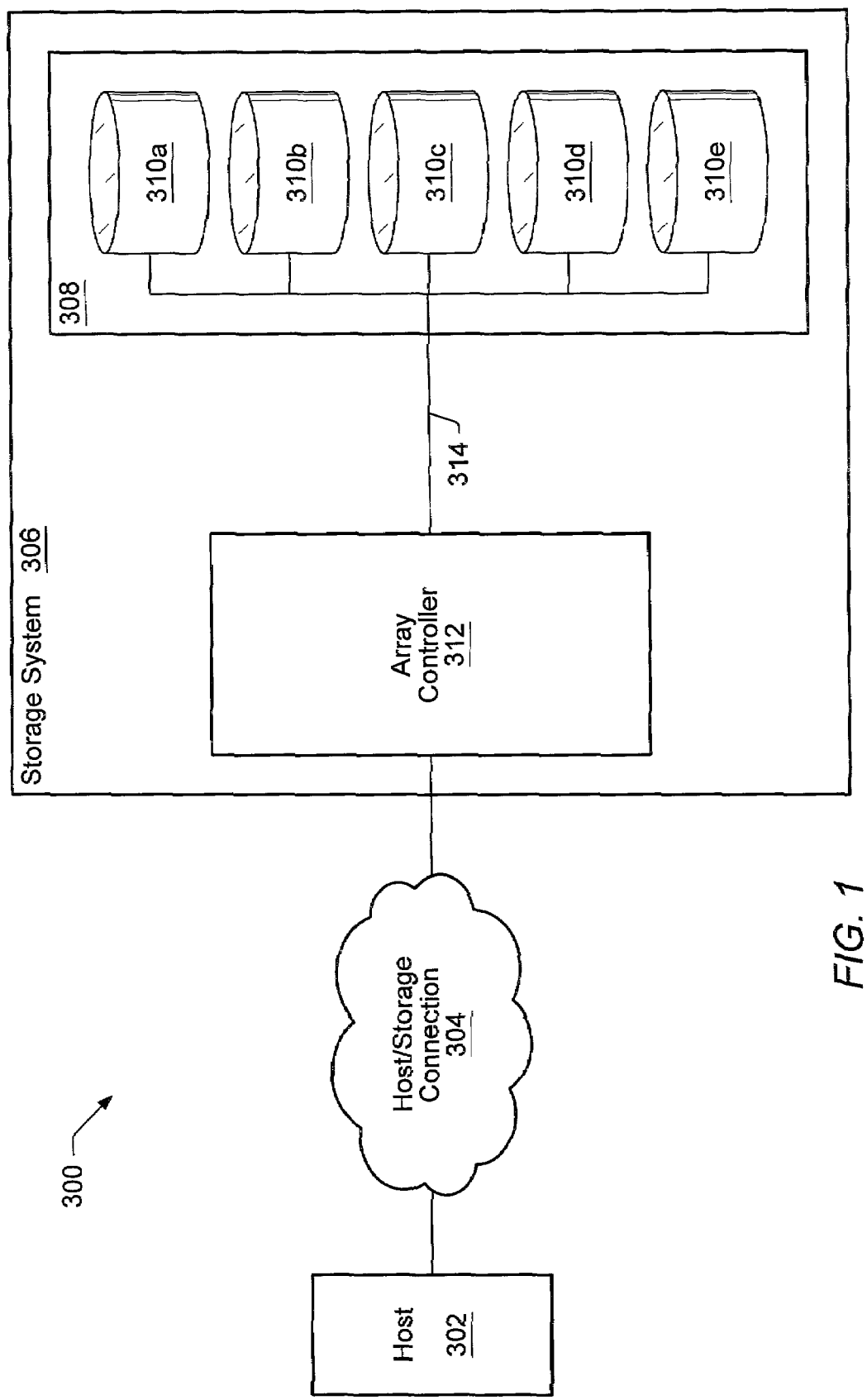
FIG. 1 shows one embodiment of a computer storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one example of a system that may perform accumulation operations (i.e., operations that use an accumulator to store intermediate results) on block operands. In FIG. 1, a functional block diagram of a data processing system 300, which includes a host 302 connected to a storage system 306 via host/storage connection 304 is shown. Host/storage connection 304 may be, for example, a local bus, a network connection, an interconnect fabric, or a communication channel. Storage system 306 may be a RAID storage subsystem or other type of storage array. In various embodiments, a plurality of hosts 302 may be in communication with storage system 306 via host/storage connection 304.

Contained within storage system 306 is a storage device array 308 that includes a plurality of storage devices 310a–310e. Storage devices 310a–310e may be, for example, magnetic hard disk drives, optical drives, magneto-optical drives, tape drives, solid state storage, or other non-volatile memory. As shown in FIG. 1, storage devices 310 are disk drives and storage device array 308 is a disk drive array. Although FIG. 1 shows a storage device array 308 having five storage devices 310a–310e, it is understood that the number of storage devices 310 in storage device array 308 may vary and is not limiting.

Storage system 306 also includes an array controller 312 connected to each storage device 310 in storage array 308 via data path 314. Data path 314 may provide communication between array controller 312 and storage devices 310 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 312 may take many forms, depending on the design of storage system 306. In some systems, array controller 312 may only provide simple I/O connectivity between host 302 and storage devices 310 and the array management may be performed by host 302. In other storage systems 306, such as controller-based RAID systems, array controller 312 may also include a volume manger to provide volume management, data redundancy, and file management services. In other embodiments of the present invention, the volume manager may reside elsewhere in data processing system 300. For example, in software RAID systems, the volume manager may reside on host 302 and be implemented in software. In other embodiments, the volume manager may be implemented in firmware that resides in a dedicated controller card on host 302. In some embodiments, array controller 312 may be connected to one or more of the storage devices 310. In yet other embodiments, a plurality of array controllers 312 may be provided in storage system 306 to provide for redundancy and/or performance improvements.

Computer systems such as storage system 306 may perform various block operations. For example, multiple operations may be performed on a series of block operands using an accumulator memory to store intermediate results. Similarly, in graphics systems, multiple operations may be performed on one or more blocks of display information, using a texture or frame buffer as an accumulator memory to store intermediate results.

One block accumulation operation that storage system 306 may perform is a block parity calculation. The storage system 306 shown in FIG. 1 may store data in stripes across the storage devices 310 and calculate a parity block for each stripe. The parity block may be calculated from each block in a stripe. The array controller 312 may initiate the parity block calculation using a series of commands that store intermediate results in an accumulator memory. The parity calculation may be performed using many different algorithms, including XOR, even or odd parity, CRC (cyclic redundancy code), ECC (Error Checking and Correcting or Error Checking Code), Reed-Solomon codes, etc. For example, in one embodiment, a parity calculation P for a 4-block stripe may equal B0 XOR B1 XOR B2 XOR B3, where B0–B3 are each blocks of data. The parity block P may be calculated using the following steps, where A represents a block operand or result that is stored in a portion of an accumulator memory:

(1) A=B0
(2) A=A XOR B1
(3) A=A XOR B2
(4) A=A XOR B3
(5) P=A

Figure 2:
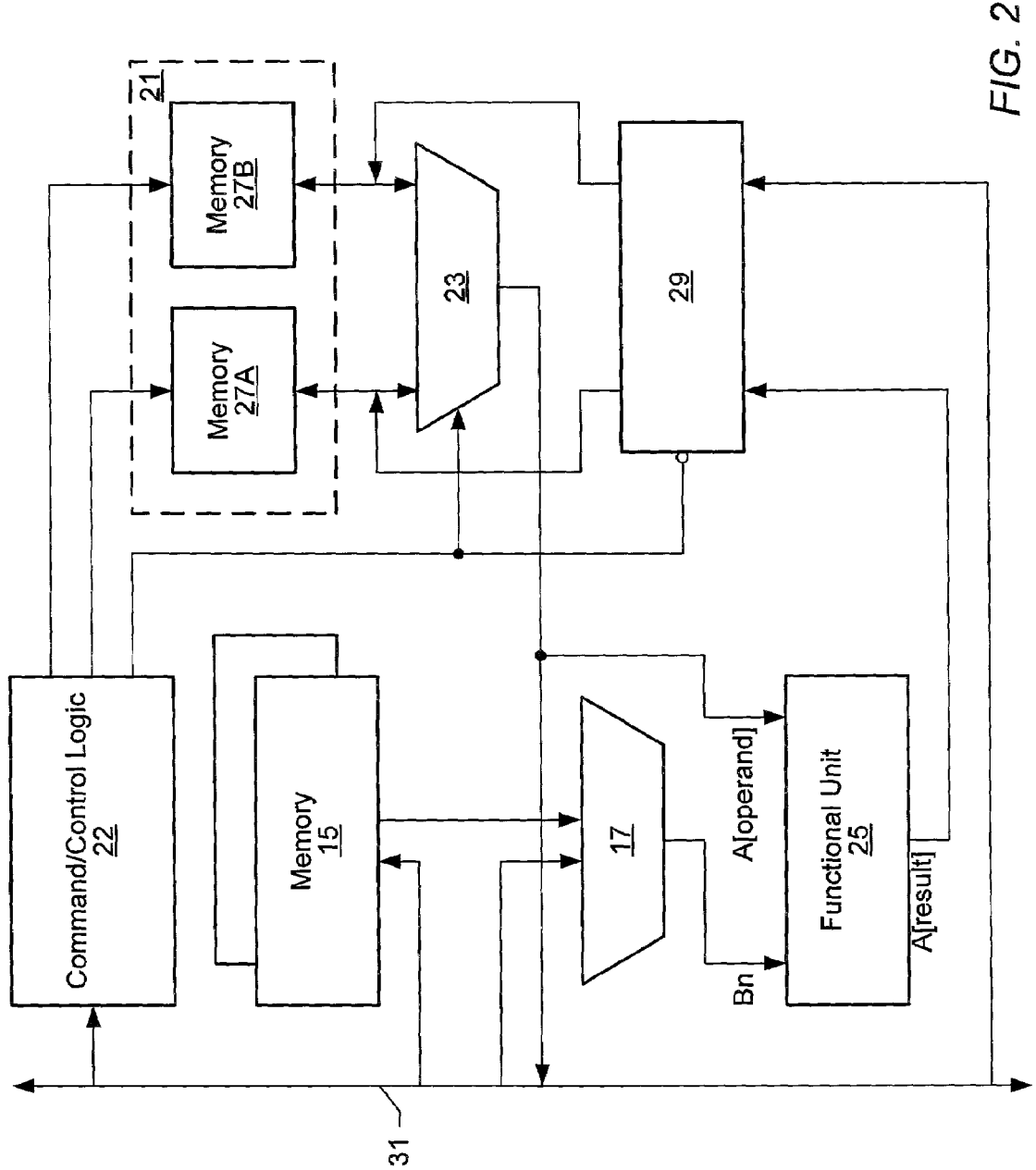
FIG. 2 illustrates one embodiment of a system for performing a block operation.

Turning to FIG. 2, one embodiment of a system for performing an accumulation operation on block operands is shown. For simplicity, the embodiment illustrated in FIG. 2 is described using the parity calculation example defined in steps 1–5 above. However, in other embodiments, the system shown in FIG. 2 may be configured to perform other and/or additional block operations.

Functional unit 25 may be configured to perform one or more different operations on one or more block operands. For example, the functional unit 25 may include dedicated hardware configured to perform a specific function (e.g., addition, subtraction, multiplication, XOR or other parity calculations, etc.). Operands may be provided to the functional unit 25 from several sources. For example, in this embodiment, multiplexer 17 may be used to select a first operand from either memory 15 or another source (e.g., a disk drive) via bus 31. Multiplexer 23 may be used to select another operand from one of the independently interfaced memory banks 27 in the accumulator memory 21.

The independent interfaces of memory banks 27 allow each memory bank 27 to receive separate control signals and have separate data buses for receiving and outputting data. Thus, memory bank 27A may receive a read command and, in response, output data on its data bus during the same memory access cycle that memory bank 27B receives a write command and, in response, stores data that is present on its data bus.

The functional unit 25 may be configured to perform an operation such as an XOR operation a byte or word at a time. For example, the functional unit may receive successive words of each operand, XOR the received words, and output successive words of the result.

The control logic 22 controls an accumulator memory 21 that includes two independently interfaced memory banks 27. Control logic 22 may include a memory controller that controls read and write access to the memory banks 27. For example, the control logic may be configured to provide signals that identify a memory location to be accessed to each of the memory banks 27. Additionally, the control logic 22 may generate signals indicative of what type of operation (e.g., read or write) should be performed on the identified memory location and that cause that operation to be performed.

Selection device 29 may be configured to provide data from either bus 31 or function unit 25 to either of the memory banks 27. Control logic 22 may assert one or more signals indicating which input selection device 29 should accept and which memory device 27 that input should be provided to.

Multiplexer 23 may select data from either one of the memory banks 27 and provide the selected data to bus 31 and/or functional unit 25. Multiplexer 23 may be controlled by control logic 22.

In this embodiment, a higher-level controller (e.g., a RAID array controller) may initiate a block XOR operation to calculate the parity P of a stripe of data B, which includes four blocks of data B0–B3, by issuing the series of commands 1–5 shown above.

Control logic 22 may be configured to receive commands identifying A (e.g., by specifying an address of the accumulator memory 21 to identify A) as an operand or a result and, in response, to cause the memory banks 27 to store or provide data as requested. For example, in response to receiving command 1, control logic 22 may generate signals that identify a location in memory bank 27A. Control logic 22 may also generate signals that instruct memory bank 27A to store data to that location. If B0 is being provided from bus 31, control logic 22 may cause selection device 29 to select the data being provided from the bus 31 and to direct that data to memory bank 27A to be written to the location in memory bank 27A.

The next time control logic 22 receives a command that identifies A as an operand, control logic 22 may cause memory bank 27A to output the data that was stored in step 1. So, in response to receiving command 2, the data is output from memory bank 27A and the control logic may generate the proper signals to cause multiplexer 23 to select memory bank 27A's output to be provided to functional unit 25. Since B1 is being provided via bus 31 or from memory 15, multiplexer 17 may be used to provide B1 to the functional unit 25. In response to receiving the two operands, A and B1, functional unit 25 may perform the XOR operation and output the result.

Since A is also identified as a result in step 2, control logic 22 may generate signals that identify a location in memory bank 27B and that tell memory bank 27B that a write is being performed. The control logic 22 may also generate signals that cause selection device 29 to provide the functional unit 25's output to memory bank 27B. Thus, control logic 22 may cause the result to be stored in memory bank 27B. This way, the result is written to a different memory bank 27B than the operand is stored in. Since the two memory banks 27 are independently interfaced, data may be read from one memory bank during the same block access cycle that data is being written to the other. Thus, control logic 22 may generate the signals that cause memory bank 27A to output data at approximately the same time as it generates the signals that cause memory bank 27B to store data being output from functional unit 25.

When control logic 22 receives the command for step 3, control logic 22 may cause memory bank 27B to output the data stored in step 2 and multiplexer 23 to provide memory bank 27B's output to the functional unit 25. Multiplexer 17 may be used to provide B2 to the functional unit 25 from either memory 15 or from a source connected to bus 31. Functional unit 25 may perform the XOR operation on the two operands and output the result. In order to store the result in a different memory bank than the operand is currently stored in, control logic 22 may generate signals that cause selection device 29 to provide the functional unit 25's output to memory bank 27A. Control logic 22 may also generate signals identifying a location in memory bank 27A and causing memory bank 27A to store the result to that location.

Similarly, when control logic 22 receives the command for step 4, it may generate signals that cause memory bank 27A to output the data stored in step 3 and multiplexer 23 to provide memory bank 27A's output to the functional unit 25. Control logic 22 may generate signals that cause selection device 29 to provide the result from functional unit 25 to memory bank 27B and that cause memory bank 27B to store the result. In step 5, the control logic 22 may generate signals that cause the final result stored in memory bank 27B to be output via multiplexer 23 to the bus 31.

As this example operation shows, control logic 22 may be configured to alternate between which memory bank stores A so that one memory bank 27 is providing the operand to the functional unit while the other memory bank 27 is storing the result. Accordingly, the control logic 22 for the two independently interfaced memory banks may essentially map the address specified in the commands to the address of a location in either memory bank 27A or 27B in order to alternate between storing the result in memory bank 27A and memory bank 27B as each step of the operation is performed. Thus, the steps of the parity calculation, as implemented by the control logic 22, may be:

(1) A[memory bank 27A]=B0
(2) A[memory bank 27B]=A[memory bank 27A] XOR B1
(3) A[memory bank 27A]=A[memory bank 27B] XOR B2
(4) A[memory bank 27B]=A[memory bank 27A] XOR B3
(5) P=A[memory bank 27B]

Accordingly, even though the commands from the higher-level controller may use a single address to identify A, control logic 22 may control the memory banks so that the result A is not stored in the same memory bank 27 as the operand A in any given step. Control logic 22 may also track which memory bank 27 contains the current value of A (from the higher-level controller's perspective). For example, the control logic 22 may map A to addresses within the memory banks 27. Control logic 22 may use these address mappings to track which memory bank 27 contains the current value of A. Because the control logic 22 controls the memories 27 this way, the higher-level controller may view accesses to these memory banks 27 as accesses to a single memory, even though two separate memory banks are actually being used. Accordingly, the system shown in FIG. 2 may be used in an existing system with very little, if any, modification of the existing higher-level controller.

Because memory banks 27 are independently interfaced, the operand A can be read from one memory bank while the result is being written to the other. Since the operation may be performed without having to read and write to the same memory bank in the same step, the accumulator memory 21 may not create a performance bottleneck so long as the memory banks 27 are each providing and storing data at the same rate as the other operand, Bn, is being provided from either memory 15 or from another source via bus 31.

Additionally, since the result of the previous step is not overwritten during each step, a single step of the operation may be restarted if an error occurs. For example, if an error occurs in step 2 as operand B1 is being transferred to the functional unit 25, step 2 may be cancelled. Since operand A is still stored, unmodified, in memory bank 27A, step 2 may then be restarted (as opposed having to start again at step 1) by control logic 22. The control logic 22 may cause memory bank 27A to provide the data to the functional unit 25 again, and the result of the restarted operation may be written to memory bank 27B.

Additionally, because independently interfaced memory banks are used in the accumulator memory, the accumulator memory may not need specialized memory components (e.g., dual-ported VRAM or double-speed memory) to keep up with the source of operand Bn. Accordingly, memory banks 27 may include standard, high-volume production memory components. For example, in the embodiment illustrated in FIG. 2, the memory used for each memory bank 27 may be the same type (e.g., DRAM) and speed of memory as memory 15.

When using the system shown in FIG. 2, one memory bank 27 may remain in read mode while the other remains in write mode for the duration of each step. If the memories banks 27 remain in one mode for the duration of each step (as opposed to having to alternate between read and write mode repeatedly for each byte or word of the block operation each step), the memory banks 27 may operate more efficiently.

In the previous example, the commands specified each operation using the same address A to identify both an operand and a result. In another embodiment, commands may initiate a similar calculation using two or more different accumulator addresses (as opposed to a single accumulator address). For example, the XOR calculation described above may be implemented using these commands, where A and C each represent an address in the accumulator memory:

(1) A=B0
(2) C=A XOR B1
(3) A=C XOR B2
(4) C=A XOR B3
(5) P=C

A system similar to the one shown in FIG. 2 may be used to perform this operation. For example, in one embodiment, the control logic 22 may be configured to receive the command for step 1 and cause selection device 29 to provide B0 to memory bank 27A in order to store B0 to a location in memory bank 27A. In step 2, control logic 22 may cause memory bank 27A to provide A to the functional unit 25 via multiplexer 23 and to store the result to memory bank 27B. Similarly, in step 3, the control logic may cause memory bank 27B to provide the data stored in step 2 to the functional unit 25. The control logic 22 may also cause memory bank 27A to store the result provided by the functional unit 25. In step 4, the result from step 3 may be provided from memory bank 27A and the result from the functional unit 25 may be written to memory bank 27B. In step 5, the result stored in step 4 may be provided from memory bank 27B to the bus 31.

Thus, like the control logic 22 in the previous example, the control logic 22 may be configured to control memory banks 27 in such a way that neither memory is both written to and read from in the same block operation step. In this example, since operands A and C may be identified by different addresses, the control logic 22 may be configured to dynamically map the addresses used to identify operands A and C to addresses in memory banks 27 each step so that A and C are consistently mapped to different banks. Thus, control logic 22 may treat the addresses provided in the commands from the system level controller as virtual addresses and use its address mappings to locate the requested data in one of memory banks 27.

Figure 3A:
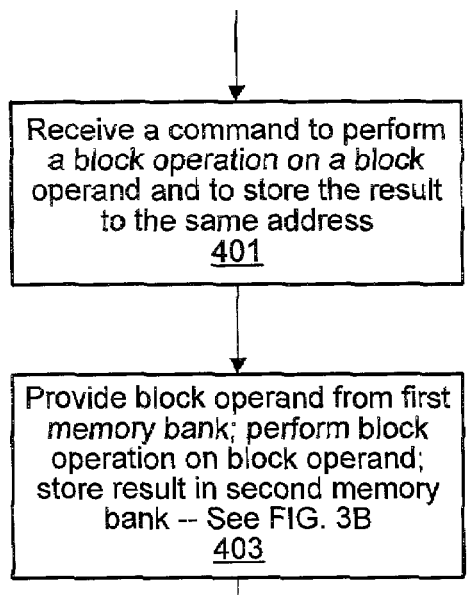
FIGS. 3A & 3B illustrate one embodiment of a method for performing a block operation.

FIG. 3A illustrates one embodiment of a method for performing a block operation. At 401, a command to perform an operation on an operand in an accumulator memory and to store the result of the operation to the address of the operand is received. For example, the command may be a command to perform a parity calculation (e.g., A=A XOR Bn) issued by a storage array controller. The first operand may be multiple bytes or words in size. The command may identify the operand and the storage location for the result using an address (e.g., A) of the accumulator memory.

In response to receiving the first command, the operand is provided from a first memory bank in the accumulator memory to a device that is configured to perform the operation (e.g., a functional unit like the one shown in FIG. 2). In some embodiments, the operation may have other operands in addition to the operand that is stored in the accumulator memory. The operation is performed and the result of the operation is stored in a second memory bank, as indicated at 403. This way the accumulator memory may not present a performance bottleneck.

Depending on the configuration of the functional unit that is performing the operation, it may not be possible to provide the entire block operand to the functional unit and/or to store the entire block result of the operation as part of a single memory transaction. Instead, each byte or word in the block operand and/or block result may be provided, operated on, and stored in a separate transaction. Thus, step 403 may represent the sub-steps 433–439 shown in FIG. 3B.

Figure 3B:
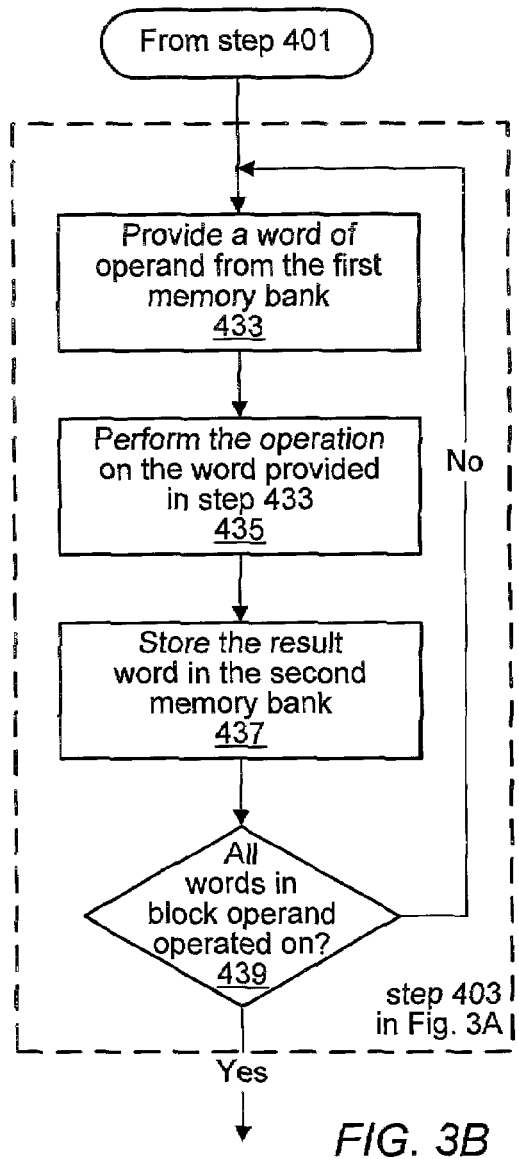

In FIG. 3B, step 403 includes multiple sub-steps. First, a byte or word of the block operand may be provided from the first memory bank to a functional unit, as shown in step 433. The operation may be performed on that byte or word, and the resulting byte or word may be stored in the second memory bank, as indicated at 435–437. These sub-steps 433–437 may be repeated for successive bytes or words of the block operand until the entire block operand has been operated on, as shown at 439.

Returning to FIG. 3A, since the first and second memory banks are independently interfaced, the result may be stored in the second memory bank at the same time the operand is being provided from the first memory bank during step 403. If a second command is subsequently received that identifies a second operand using the same address specified in step 401, the second operand may be provided from the second memory bank, since that is where the result of the first operation was stored. For example, an address mapping that maps the address of the result to the location in the second memory bank in which the result of the first operation was stored may be created in step 403. This address mapping may be used to later provide a second operand identified by the same address. This way, the correct value of the operand may be provided in response to each received command.

Additionally, if the operand is stored in a different memory bank than the result, the operand will not be overwritten by the result. Accordingly, if an error occurs while the operation is being performed, the operation specified in a particular command may be restarted (as opposed to having to restart an entire series of commands).

Figure 4:
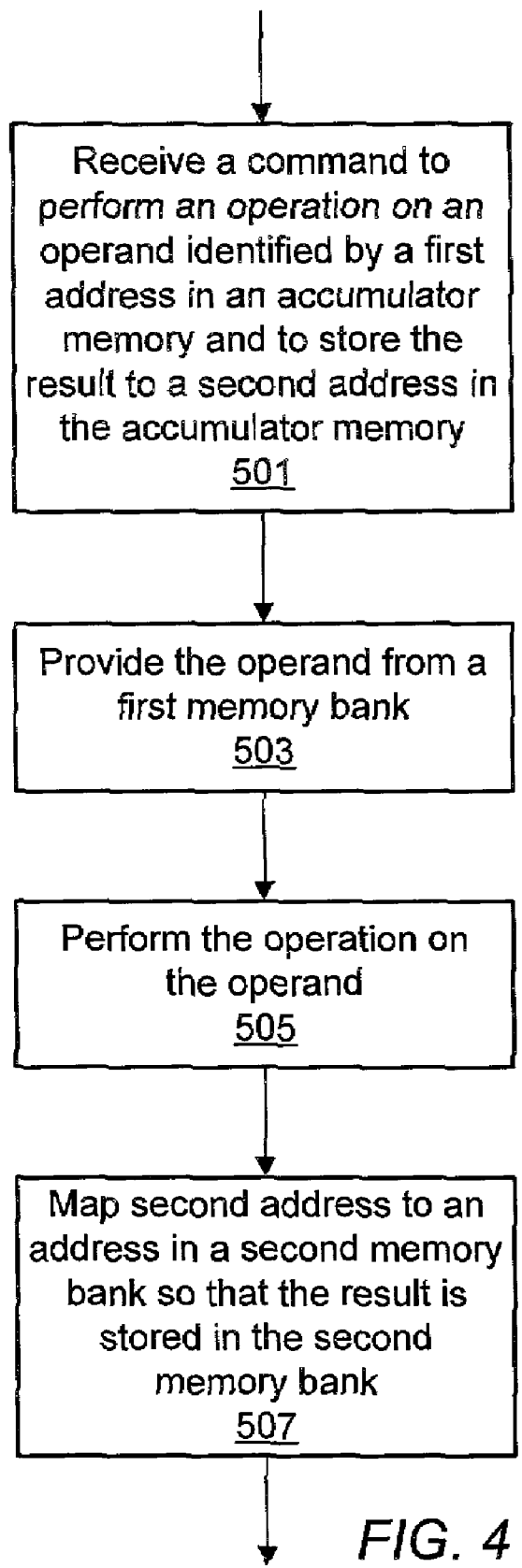
FIG. 4 shows another embodiment of a method of performing a block operation.

FIG. 4 shows another embodiment of a method for performing a block operation. In FIG. 4, the block operation is initiated in response to receiving a command to perform an operation on an operand identified by a first address in an accumulator memory, as indicated at 501. The command specifies that the result of the operation should be stored in a second address in the accumulator memory. In some embodiments, the first and second addresses may be the same. The accumulator memory includes two independently interfaced memory banks.

In response to receiving the command, the operand may be provided from whichever memory bank in the accumulator memory is currently storing the operand. For example, if the first memory bank is currently storing the operand, the operand may be provided from the first memory bank, as shown at 503, and the operation may be performed on the operand, as shown at 505. The second address may be mapped to an address in the second memory bank so that the result will be stored in a different memory bank than the operand is stored in, as indicated at 507. Note that steps 503–507 may represent multiple sub-steps such as steps 433–439 shown in FIG. 3B. If the first and second memory banks are independently interfaced, the operand may be provided from the first memory bank at the same time as the result is being written to the second memory bank.

If another command that identifies an operand using the second address is received, the address mapping that was created when the second address was mapped to an address in the second memory bank may be used to access the result stored in the second memory bank in step 507. If this command stores a result to another address in the accumulator memory, the result address may be remapped to an address in the first memory bank. Thus for each command that specifies addresses in the accumulator for both an operand and a result, the method may remap the result addresses so that the result is always stored in a different memory bank than the operand.

Cache Accumulator Memory

In some embodiments, an accumulator memory may be configured as a cache for a larger memory. This may allow a programmer to address operands in the larger memory, relieving the programmer of having to directly manage the accumulator memory. Additionally, if the accumulator memory acts as a cache, its effective size may be significantly increased. This may increase the efficiency of the accumulator memory when multiple accumulation operations are being performed at the same time. For example, if a non-caching accumulator memory of size M is configured to store operands of size N, only M/N accumulation operations may be performed at the same time without stalling additional operations or requiring a high-level controller to swap operands between the accumulator memory and a larger memory. Requiring the intervention of a high-level controller may consume cycles on both the high-level controller and bus bandwidth. Additionally, if the accumulator memory is configured to transfer operands in and out of the larger memory as part of its cache functionality, this function may not need to be managed by a higher-level controller, increasing the efficiency of accumulation operations in some embodiments.

Figure 5:
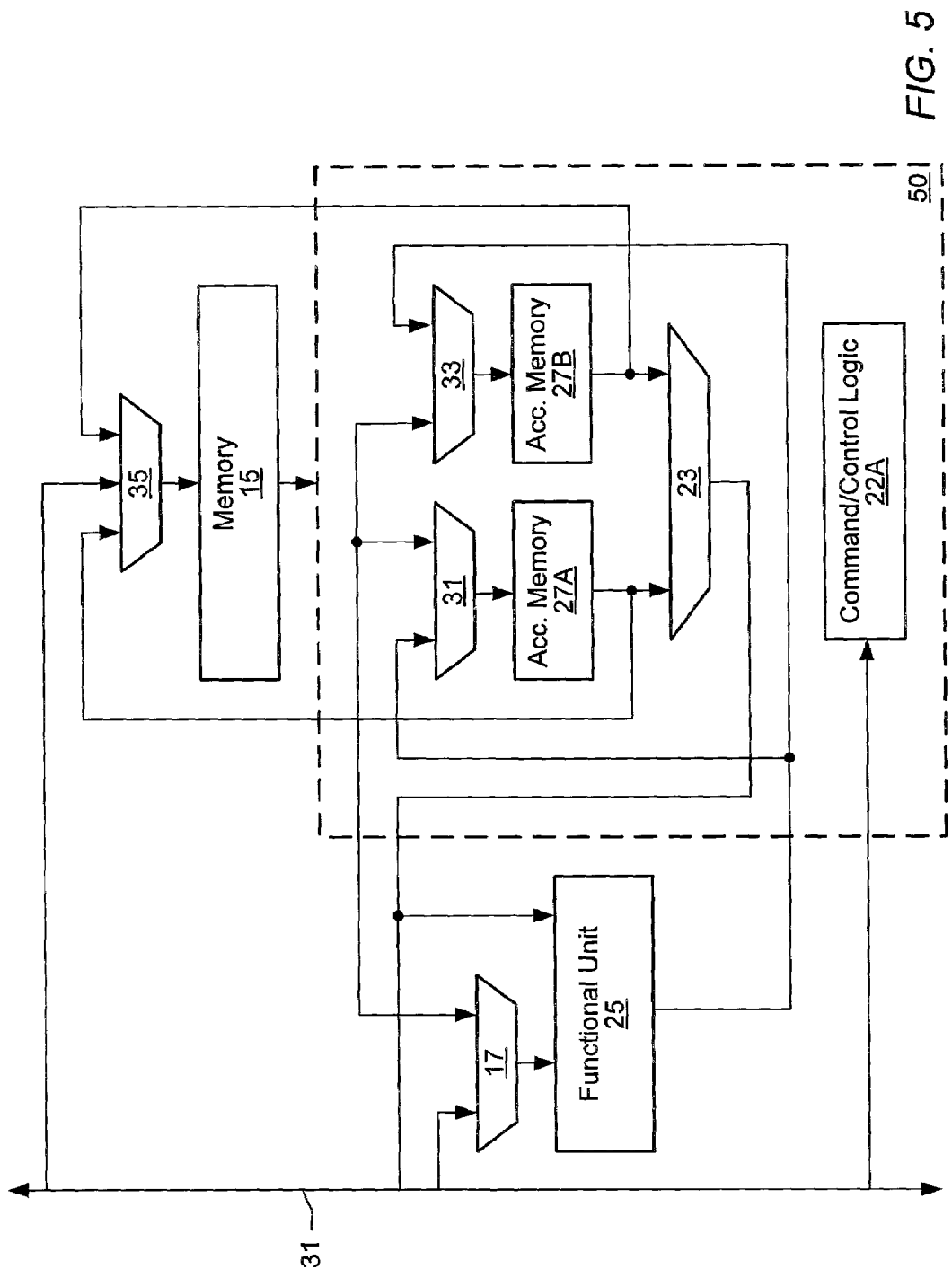
FIG. 5 shows a block diagram of one embodiment of a cache accumulator.

FIG. 5 shows one embodiment of a system for performing block operations that includes a cache accumulator memory 50. In the illustrated embodiment, cache accumulator memory 50 is coupled to functional unit 25. Cache accumulator memory 50 provides operands to functional unit 25 and accumulates the results of the operations performed on those operands by functional unit 25. Cache accumulator memory 50 is configured as a cache for memory 15. In some embodiments, both cache accumulator memory 50 and memory 15 may include the same type (e.g., DRAM, VRAM, SRAM, DDR DRAM, etc.) and speed of memory devices. In other embodiments, cache accumulator memory 50 and memory 15 may each include a different type and/or speed of memory device.

Functional unit 25 may be configured to perform one or more different operations on one or more block operands. The functional unit 25 may include dedicated hardware configured to perform a specific function (e.g., addition, subtraction, multiplication, XOR or other parity calculations, etc.). For example, cache accumulator memory 50 may be included in a storage system to perform parity calculations, and functional unit 25 may perform XOR operations on block operands.

Operands may be provided to the functional unit 25 from several sources. For example, in this embodiment, multiplexer 17 may be used to select a first operand from either memory 15 or another source (e.g., a disk drive) via bus 31. Multiplexer 23 may be used to select another operand from one of the independently interfaced memory banks 27A and 27B in the cache accumulator memory 50.

As in the system shown in FIG. 2, the independent interfaces of memory banks 27A and 27B (collectively referred to as memory banks 27) allow each memory bank 27 to receive separate control signals and have separate data buses for receiving and outputting data. Thus, memory bank 27A may receive a read command and, in response, output data on its data bus during the same memory access cycle that memory bank 27B receives a write command and, in response, stores data that is present on its data bus.

The functional unit 25 may be configured to perform an operation such as an XOR operation a byte or word at a time. For example, the functional unit may receive successive words of each block operand, XOR the received words, and output successive words of the result. Thus, accumulator memory bank 27A may be in a read mode to provide successive words of each block operand to the functional unit at the same time as memory bank 27B is in a write mode to store successive words of the block result as they are output by the functional unit.

The control logic 22A controls accumulator memory 50 by providing the appropriate control and address signals to the various components. Control logic 22A may provide control signals to multiplexers 35, 31, 33, 23, and/or 17. Thus, operands from bus 31, memory bank 27A, or memory bank 27B may be selected to be stored in memory 15 by providing appropriate control signals to multiplexer 35. Operands from memory 15 may be loaded into one of the accumulator memory banks 27 by providing proper control signals to one of multiplexers 31 and 33. An operand from one of the accumulator memory banks 27 may be provided to the functional unit 25 by providing control signals to multiplexer 23.

Control logic 22A may include a memory controller that controls read and write access to the memory banks 27. For example, the control logic may be configured to provide signals that identify a memory location to be accessed to each of the memory banks 27. Additionally, the control logic 22A may generate signals indicative of what type of operation (e.g., read or write) should be performed on the identified memory location and that cause that operation to be performed. Control logic 22A may provide similar control and address signals to memory 15.

The cache accumulator memory banks 27A and 27B may be configured to be accessed using addresses in memory 15. Control logic 22A may track which operands (identified by addresses in memory 15) are stored in accumulator memory banks 27 and which location within each accumulator memory bank 27 each operand is currently stored at.

Whenever control logic 22A detects an instruction specifying that an operation should be performed on an operand stored in memory 15, control logic 22A may first determine whether that operand "hits" (i.e., is present) in one of the accumulator memory banks 27. If so, the control logic may cause the memory bank (e.g., 27A) storing the operand to output that operand to the functional unit and cause the other memory bank (e.g., 27B) to store the result of that operation. If the operand misses in the set of accumulator memory banks 27, control logic 22A may cause the operand to be fetched into one of the accumulator memory banks 27 from memory 15. If all of the blocks in accumulator memory banks currently contain valid data, control logic 22A may select one of the blocks to overwrite before fetching the specified operand from memory 15. If the block selected for replacement contains modified data (e.g., an operand whose current value has not been copied back to memory 15), control logic may write that data back to memory 15 before performing the cache accumulator fill.

Various replacement schemes may be selected to select values to overwrite during cache accumulator fills. For example, a random replacement scheme may specify that any block within the cache may be selected for replacement. A First In, First Out cache replacement scheme may select the "oldest" block operand or result for replacement. LRU (Least Recently Used) replacement schemes may also be used. A LRU replacement scheme selects the least recently accessed block operand or result for replacement. In general, any replacement scheme may be used within a cache accumulator memory.

FIGS. 6–8 show how one embodiment of a cache accumulator may perform various accumulation operations. FIG. 6 shows the contents of memory 15, accumulator memory bank 27A, and accumulator memory bank 27B as a series of instructions in an accumulation operation are performed. In this example, the accumulation operation P=B0 XOR B1 XOR B2 XOR B3 XOR B4 is being performed using a series of five instructions. Each operand B0–B4 is addressed and present in memory 15. Accumulator memory banks 27 contain no valid data at the beginning of this operation. The terminology B(new) and B(old) is used to distinguish the different values of the accumulation operand B. B(new) refers to the result of the current instruction while B(old) refers to the result of the previous instruction.

In response to the first instruction, B=B0, block operand B0 is loaded from memory 15 to accumulator memory bank 27A. Note that the choice of which memory bank and which location within that memory bank the operand is initially loaded into is arbitrary. The next instruction, B=B XOR B1, causes accumulator memory bank 27A to output operand B to functional unit 25. Memory 15 outputs operand B1 to functional unit 25. Functional unit 25 generates the block result, B(new), and this result is stored in accumulator memory bank 27B. This way, the result of the previous instruction is still available in memory bank 27A so that the current instruction (B=B XOR B1) may be repeated if an error occurs (e.g., during transmission or in the functional unit).

The third instruction, B=B XOR B2, causes control logic 22A to generate signals that cause accumulator memory bank 27B to output the operand B(old). Control logic 22A may also cause memory 15 to output B2. Functional unit 25 performs the XOR operation on the block operands. Control logic 22A asserts signals that cause accumulator memory bank 27A to store the block result B(new) of the accumulation operation. Similarly, the next instruction, B=B XOR B3, causes memory 15 to output B3 and memory bank 27A to output operand B to the functional unit 25. The block result, B(new), is stored in memory bank 27B.

In response to the fifth instruction, control logic 22A causes memory bank 27B to output operand B. Control logic 22A may also cause memory 15 to output B4. The functional unit 25 performs the accumulation operation (XOR) on the two operands and the block result, B(new), is stored in memory bank 27A. The final flush cache instruction causes the value of operand B (B(new) in accumulator memory bank 27A) to be written back to memory 15. The flush cache instruction may also cause all of the blocks in the accumulator memory banks 27 (or at least all of those used to perform this particular accumulation operation) to be invalidated.

FIG. 7 shows an example of the contents of one embodiment of memory 15 and accumulator memory banks 27 during another block accumulation operation. In this example, each operand B0–B4 is specified as an immediate operand. Thus, in this example, operands B0–B4 are provided from bus 31 instead of memory 15. In response to each instruction specifying an immediate operand, control logic 22A may cause multiplexer 17 to provide an operand on bus 31 to functional unit 25. Operand B is identified by an address in memory 15 and the final value of operand B is written back to memory 15 at that address when the accumulation operation is complete.

In response to the first instruction, B=B0, control logic 22A may cause memory bank 27A to store operand B0. Note that the accumulator memory banks may not be connected to receive inputs directly from bus 31 in all embodiments (however, they may be configured that way in some embodiments). Thus, in one embodiment, control logic 22A may cause B0 to be stored in memory bank 27A by providing B0 and a string of logical 0's as the inputs to functional unit 25 and asserting signals causing multiplexer 31 to select the functional unit's output (which is B0 since X XOR 0=X) to be stored in memory bank 27A. As in the example shown in FIG. 6, each subsequent instruction causes one of the memory banks 27 to output the result of the previous instruction and the other memory bank to store the result of the current instruction.

FIGS. 8A and 8B shows another example of the contents of one embodiment of memory 15 and accumulator memory banks 27 in response to another sequence of instructions. In this example, multiple accumulation operations using operands B–D are executing concurrently. FIG. 8A shows these accumulation operations and the instruction steps that may be used to perform them. Particular, FIG. 8B shows an exemplary order of the instructions used to perform each block accumulation operation. The actual order of instructions in an embodiment may depend on the relative times at which the block accumulation operations started and the relative times at which operands for each block accumulation operation are available in memory 15 (or as immediate operands on bus 31). For example, operands currently stored on a disk may take longer to be available in memory 15 than operands currently being transmitted on bus 31.

For simplicity, in this example memory banks 27 are each able to store two block operands at a time and are fully associative. Other embodiments of memory banks 27 may have significantly larger (or smaller) storage capacity and use different levels of associativity (e.g., memory banks 27 may be set associative or direct mapped).

FIG. 8B shows the specific effects of each instruction on memory banks 27. FIG. 8B also shows additional operations needed to manage the cache accumulator (e.g., flushes, loads, and stalls) while performing the sequence of instructions. Instruction 1, B=B0, causes control logic 22A to check whether B hits (i.e., is present) in one of the accumulator memory banks 27. Since operand B does not hit in memory banks 27 (because this accumulation operation has just started, so no block storage location has been allocated to it), control logic 22A allocates a block to B in accumulator memory bank 27A and causes B0 to be loaded from memory 15 into that block. In response to the next instruction, B=B XOR B1, control logic 22 causes memory 15 to output B1 and accumulator memory bank 27A to output B(old) to the functional unit 25. The result B(new) from the functional unit 25 is stored in accumulator memory bank 27B. Similarly, the next instruction's operands B and B2 are output from memory bank 27B and memory 15 respectively and operated on by functional unit 25. The result B(new) is stored in accumulator memory bank 27A.

The next instruction, C=C0, is the first instruction in a new block accumulation operation. Accordingly, control logic 22A allocates a block in accumulator memory 27A to C and loads C0 into that block as the first value of C. Both the current value of B and the current value of C are stored in accumulator memory bank 27A (in this example, each accumulator memory bank may store up to two block operands at a time) after this instruction is performed. C=C XOR C1 causes control logic 22A to output C1 from memory 15 and C(old) from accumulator memory bank 27A. The result of this instruction, C(new), is stored in accumulator memory bank 27B. For instruction 6, C=C XOR C2, C(old) is provided from memory bank 27B and C2 is provided from memory 15. The result of the instruction, C(new) is stored in accumulator memory bank 27A. In this embodiment, the result of each instruction may be stored into a corresponding storage location within the memory bank that is not storing the operand. Thus, if the previous result is stored in storage location 1 in accumulator memory bank 27A, the new result may be stored in storage location 1 in accumulator memory bank 27B. Other embodiments may allocate storage locations within each accumulator memory bank to each accumulation operation in a different manner.

Instruction 7, B=B XOR B3, causes control logic 22A to determine whether B hits in accumulator memory banks 27. Since B is stored in accumulator memory bank 27A, B hits in the cache accumulator memory banks and may be provided to the functional unit 25 along with operand B3 from memory 15. The result, B(new), is stored in accumulator memory bank 27B.

Instruction 8, D=D0, cannot be executed because all of the storage locations in the cache accumulator memory banks 27 are currently allocated to operands for block accumulation operations B and C. Thus, control logic 22 flushes C (the least recently used operand) from accumulator memory bank 27A to memory 15. Control logic then loads the initial value of D, D0, from memory 15 into the storage location vacated by C in accumulator memory bank 27A. The next instruction, D=D XOR D1, causes D and D1 to be provided from memory bank 27A and memory 15 respectively. The result, D(new) is stored in memory bank 27B. Similarly, instruction 10, D=D XOR D2 causes D and D2 to be provided from memory bank 27B and memory 15 respectively and result D(new) to be stored in memory bank 27A.

Instruction 11, C=C XOR C3, misses in the cache accumulator since C was flushed from the cache (see row 9) to make room for D. Thus, cache controller 22A must flush another operand from the accumulator memory banks 27 to make room for operand C. Here, B is selected since B is the least recently used operand (note that other embodiments may use other cache accumulator replacement schemes such as random replacement or first in, first out replacement). The current value of B is flushed from accumulator memory bank 27B to memory 15 and C is loaded into the storage location in memory bank 27B vacated by operand B. Then, operand C (C(old)) is provided from memory bank 27B and operand C3 is provided from memory 15. Functional unit 25 performs the XOR operation on the two operands and the result, C(new), is stored in accumulator memory bank 27A.

The next instruction, D=D XOR D3, hits in the cache accumulator and the operands D and D3 are provided to the functional unit 25 from memory bank 27A and memory 15 respectively. The result, D(new), is stored in accumulator memory bank 27B.

Instruction 13, B=B XOR B4, misses in the cache accumulator, since B was flushed (at row 14) to make room for C. Thus, control logic 22A selects operand C to replace and loads the current value of B from memory 15 into memory bank 27A. Then, control logic 22A causes memory bank 27A and memory 15 to provide operands B and B4 respectively to functional unit 25. The result, B(new), is stored to accumulator memory bank 27B. Then, since this instruction is the last instruction in B's accumulation operation, a copy of B is no longer needed in the cache accumulator and control logic 22A may flush B from accumulator memory bank 27B to memory 15.

The next instruction, C=C XOR C4, misses in cache accumulator memory banks 27. Control logic 22A loads C from memory 15 into memory bank 27B (the control logic 22A may select bank 27B at random since both bank 27A and 27B are available to store an operand). Then, operands C and C4 are provided to functional unit 25 from memory bank 27B and memory 15 respectively and the result is stored in memory bank 27A. Since this instruction is the last instruction in C's accumulation operation, control logic 22A flushes operand C from memory bank 27A to memory 15.

Instruction 15, D=D XOR D4, hits in the cache accumulator (the current value of D is stored in memory bank 27B). Control logic 22A provides operands D and D4 from memory bank 27B and memory 15 respectively to functional unit 25, and the result D(new) is written to memory bank 27A. Since this is the last instruction in D's accumulation operation and no other accumulation operations are being performed, control logic 22A may flush the cache accumulator, causing any results that have not yet been written to memory 15 (in this example, only D has not yet been written back to memory) to be updated in memory 15. Control logic 22A may also cause all of the block storage locations in cache accumulator memory banks 27 to become invalid.

Figure 9:
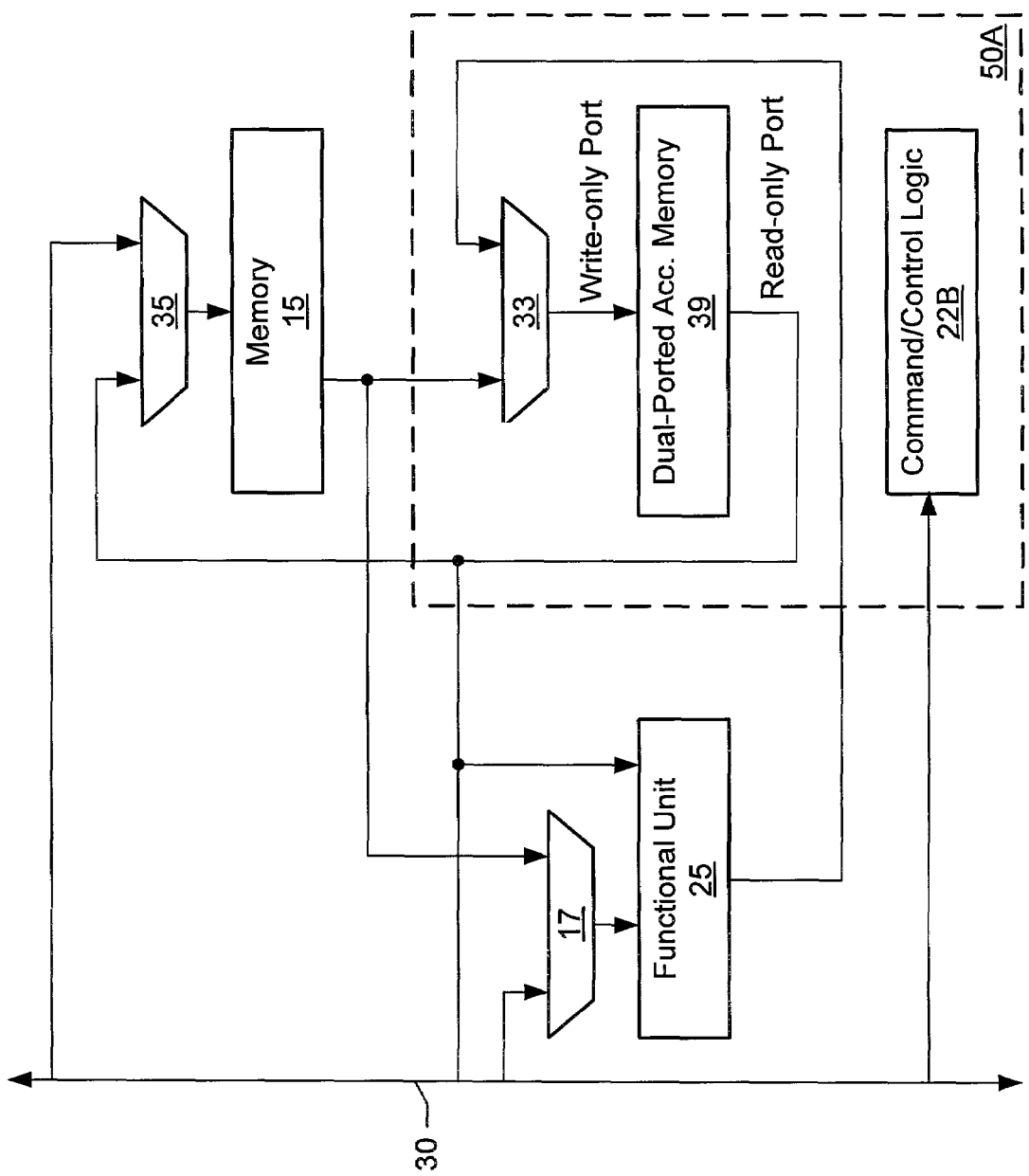
FIG. 9 is a block diagram of another embodiment of a cache accumulator.

FIG. 9 shows another embodiment of a cache accumulator memory 50A. In this embodiment, cache accumulator memory 50A includes dual-ported accumulator memory 39. Control logic 22B controls dual-ported accumulator memory 39 so that accumulator memory 39 acts as both a cache for memory 15 and an accumulator. Control logic 22B may also be configured to control multiplexers 35 and 33 and/or memory 15.

Multiplexer 35 may select data to be written to memory 15 from either bus 31 or accumulator memory 39. Multiplexer 33 may select data to be written to accumulator memory 39 via memory 39's write-only port. For example, multiplexer 33 may select data from memory 15 or a result from the functional unit 25. In some embodiments (not shown), multiplexer may also select data from bus 31.

Data from the read-only port of accumulator memory 39 may be provided as an operand to functional unit 25 or to memory 15 (e.g., via multiplexer 35). In some embodiments, the read-only port may also be coupled to output data to bus 31. Additional operands may be provided to functional unit 25 from memory 15 or from bus 31 (e.g., as selected by multiplexer 17).

Functional unit 25 may be configured to perform one or more of various block operations on one or more block operands. In one embodiment, functional unit 25 may be configured to perform parity operations on block operands (e.g., by XORing two block operands) to produce a block operand result. Such a functional unit may be used to generate a parity block for a stripe of data or to reconstruct a block of data from the remaining blocks in a stripe and the parity block for that stripe.

Generally, cache accumulator memory 50A may operate in a manner similar to cache accumulator 50 shown in FIG. 5. In response to each instruction to perform an accumulation operation, control logic 22B may determine whether a specified block operand hits in accumulator memory 39 and, if not, load the operand from memory 15 into accumulator memory 39. If the operand hits in accumulator memory 39, the operand may be provided to functional unit 25 and the result from functional unit 25 may be stored back in accumulator memory 39. Because the accumulator memory is dual-ported, a word of the operand may be provided to the functional unit via the read-only port of the accumulator memory 39 during a memory access cycle in which a word of the block result is also being stored in the accumulator memory via the write-only port. In some embodiments, each instruction's result may overwrite the previous instruction's result if the control logic is configured to overwrite the operand with the result (e.g., if both the operand and the result have the same address).

In order to provide restartability, some embodiments may be designed so that operands are written to memory 15 as they are provided to functional unit 25. This way, the operands for a previous instruction may be available if an instruction needs to be reexecuted. Alternatively, in embodiments where the ability to restart instructions is desired, control logic 22B may be configured to store the result of an instruction in accumulator memory 39 so that the result does not overwrite the operand (i.e., the previous instruction's result).

Using accumulator memory 39 as both a cache and an accumulator may increase the effective size of accumulator memory 39 (e.g., the effective size may be closer to that of memory 15) and/or simplify accumulation instructions from a programming perspective by allowing programmers to address operands by addresses in memory 15 instead of having to directly manage accumulator memory 39.

Figure 10:
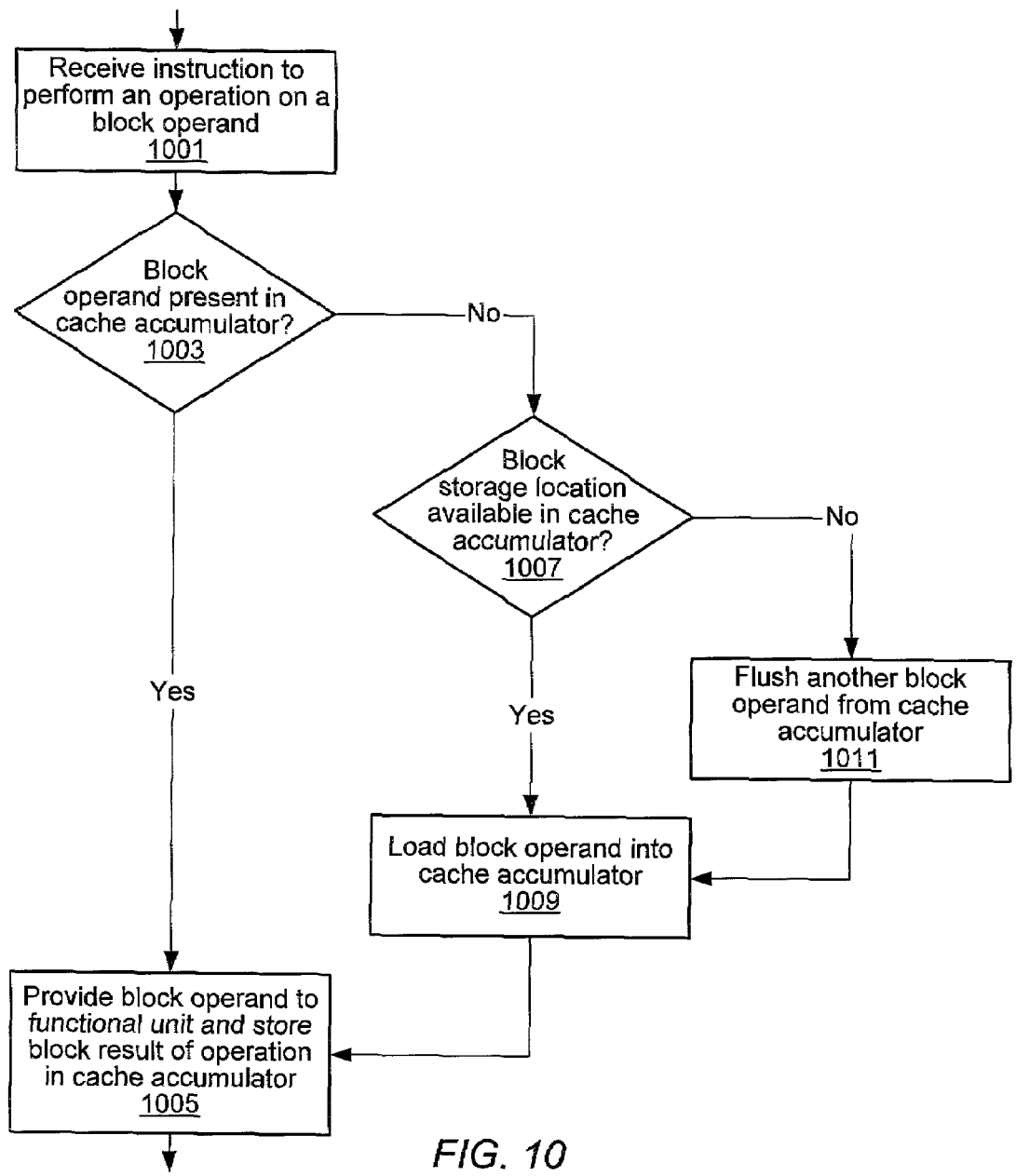
FIG. 10 is a flowchart illustrating one embodiment of a method of using a cache accumulator.

FIG. 10 shows one embodiment of a method of performing an accumulation operation using a cache accumulator memory like the ones shown in FIGS. 5 and 10. At 1001, an instruction to perform an operation on a block operand is received.

If the block operand is not present in the cache accumulator (i.e., the block operand "misses" in the cache) and there is an unallocated block storage location in the cache accumulator, the block operand is loaded from memory into the cache accumulator, as shown at 1003, 1007, and 1009.

At 1003, 1007, and 1011, if the block operand is not present in the cache accumulator and all of the block storage locations in the cache accumulator are currently allocated, one of the block operands stored in the cache accumulator is flushed to memory to make room for the new block operand. The new block operand may then be loaded into memory, at 1009. The block operand flushed to memory may be selected by a cache replacement algorithm such as an LRU algorithm.

Once the block operand is present in the cache accumulator (at 1003), the block operand is provided from the cache accumulator to a functional unit and the block result generated by the function unit is stored in the cache memory (at 1005).

In one embodiment, a cache accumulator may be configured to maintain continual coherency with respect to a larger memory. In such an embodiment, the cache accumulator's control logic may be configured to update memory 15 whenever an operand in the cache accumulator becomes modified with respect to the copy of that operand currently stored in memory 15.

In many of the above examples, the same operand identifier has been used to specify both an operand and a result in an instruction (e.g., B=B XOR B2). In some embodiments, each instruction in an accumulation operation may specify a unique result operand (e.g., A=B, D=A XOR C, F=D XOR E, G=F XOR H, etc.). In order to be able to restart each instruction if an error occurs, each unique result operand may be preserved (e.g., until the time period in which an error may be detected has passed). The result operands may be preserved in another memory bank of the accumulator memory, in different block storage locations within the same memory bank in the accumulator memory, or in another memory device (e.g., memory 15).

Cache Accumulator Memory with Associativity List

In a cache accumulator memory like the ones shown in FIGS. 5 and 9, control logic 22A or 22B may maintain an associativity list indicating the operands (and/or the accumulation operations) to which each block storage location (or set of block storage locations) is currently allocated. By using an associativity list, subsequent instructions in an accumulation operation may be directed to the same block storage location(s) already allocated to that accumulation operation. In some embodiments, the associativity mechanism may reduce the amount of "dithering" between block storage locations or between the cache and the buffer memory.

Figure 11A:
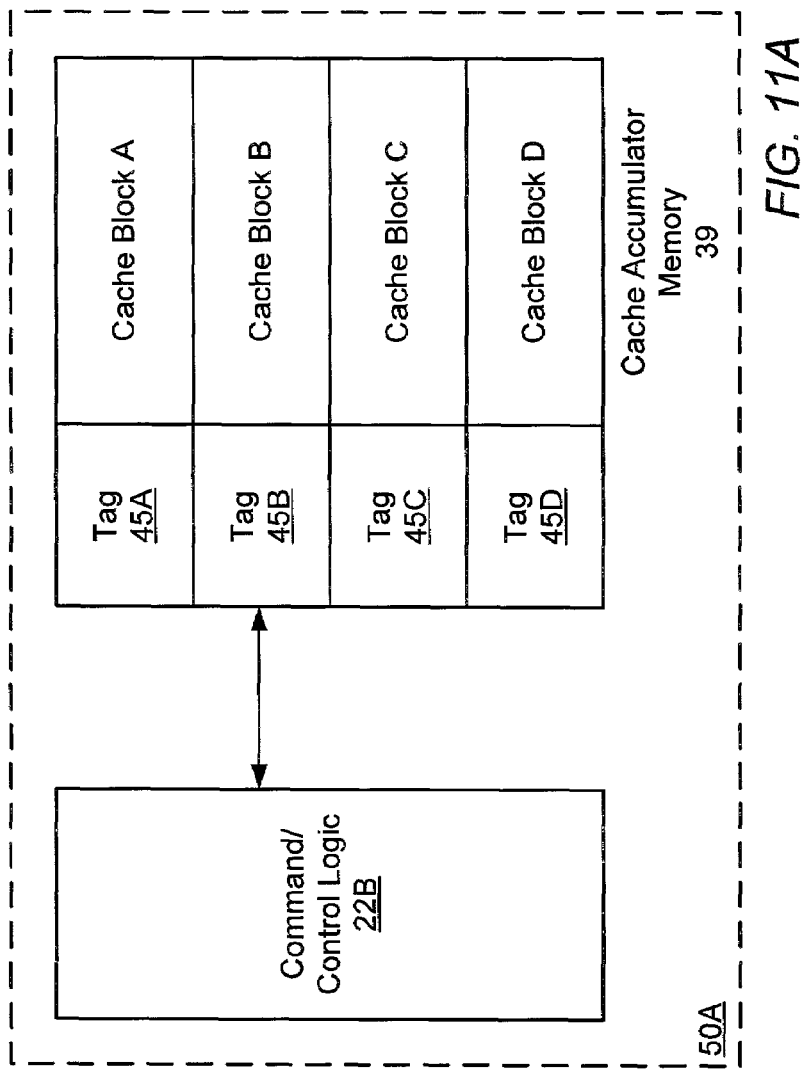
FIG. 11A is a block diagram of one embodiment of a cache accumulator that includes an associativity list.

FIG. 11A shows how a cache accumulator memory 39 (e.g., as shown in FIG. 9) may be organized as a set of block storage locations. The size of each block storage location may depend on the block size of the system that includes that cache accumulator. For example, if a system operates on 2K blocks, each block storage location in an accumulator memory may be 2K in size. In the embodiment shown in FIG. 11A, cache accumulator memory 39 has been subdivided into four block storage locations A–D (note that other embodiments may contain different numbers of blocks). In this embodiment, each block A–D is associated with one of tags 45A–45D (collectively referred to as tags 45). Together, tags 45 form an associativity list that identifies the operands that are currently stored in the cache accumulator memory 39 and the block storage location allocated to each operand. Note that in other embodiments, the tags in an associativity list may explicitly identify the accumulation operation. For example, in one embodiment, each accumulation operation may be assigned a unique identifier that is included in each instruction used to perform that accumulation operation. The tags in the associativity list may be configured to indicate which accumulation operation each block storage location is currently allocated to using the unique accumulation operation identifiers.

Figure 11B:
FIG. 11B shows an example of a tag that may be used with an embodiment of a cache accumulator like the one shown in FIG. 11A.

FIG. 11B shows one example of the information a set of tags 45A may contain. In this example, tags 45A indicate which operand the associated block storage location is storing (e.g., by indicating all or some of the bits of the address of that operand in memory 15). Tags 45A also include fields indicating whether an associated block storage location contains valid operands and/or modified data.

Figures 12A, 12B:
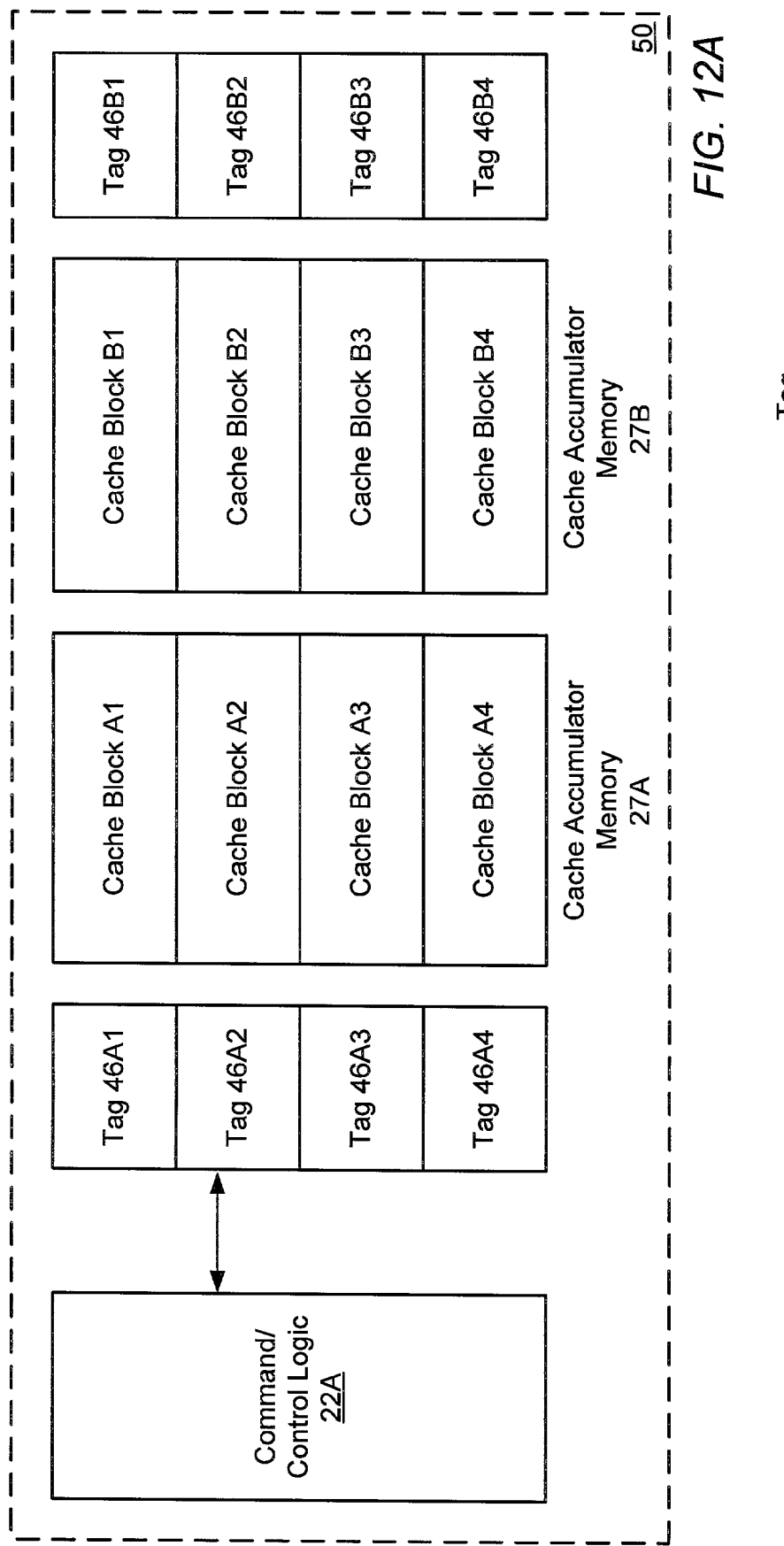
FIG. 12A is a block diagram of another embodiment of a cache accumulator that includes an associativity list.
FIG. 12B shows an example of a tag that may be used with an embodiment of a cache accumulator like the one shown in FIG. 12A.

In multi-banked embodiments of a cache accumulator memory (like the one shown in FIG. 5), each memory bank 27 may be organized into blocks, and each tag 46A1–46B4 (collectively, tags 46) may be associated with a block storage location in one of the memory banks 27, as shown in FIG. 12A. Tags 46 form an associativity list for cache accumulator 50.

FIG. 12B shows another example of the information tag 46A1 may contain. In this example, tag 46A1 is similar to the one shown in FIG. 11B and identifies the operand stored in an associated block storage location as well as whether the data stored in that block storage location is valid and/or modified. Additionally, tag 46A1 includes an additional tag field that identifies the bank (e.g., 27A) with which the tag is associated.

In an alternative embodiment, each tag 46 may be associated with a pair of block storage locations that includes one block storage location from each memory bank 27. In such an embodiment, each tag 46 may indicate which bank 27 is storing the most recently updated value of the operand.

In embodiments like those shown in FIGS. 11A and 12A, control logic 22A or 22B may use the associativity list 45 and 46 to store the results of each instruction in an accumulation operation to the block storage location(s) allocated to that accumulation operation. For example, in response the first instruction in an accumulation operation (e.g., B=B0), the control logic 22A may be configured to allocate one or more block storage locations in the cache accumulator to that accumulation operation and to store an operand (e.g., the initial value of B, which is B0) within one of the allocated block storage locations. Control logic 22A may allocate a block storage location by setting a portion of that block storage location's tag to a value identifying the block operand stored in that block storage location. For example, in one embodiment, a value that identifies a block operand may equal all or some of the bits in that operand's address.

Each time a subsequent instruction in that accumulation operation is received (e.g., B=B XOR Bx), control logic 22A may store the result of that instruction to the block storage location(s) identified by the associativity list. If the address of the result differs from the address of the operand, control logic 22A may update the associativity list to indicate the result's address so that subsequent instructions in the associativity list access the same block storage location(s).

Control logic 22A may also use the associativity list to determine whether a block operand specified in the instruction is present in the cache accumulator. If the block operand is not present, the control logic 22A may load that operand from a larger memory (e.g., memory 15A in FIGS. 5 and 9). If all of the block storage locations in the cache accumulator are currently storing block operands (i.e., there are no free block storage locations into which the specified block operand can be loaded), control logic 22A may select one of the block operands (e.g., the least recently used block operand) currently stored in the cache accumulator for replacement. If that operand is modified (e.g., as indicated by that operand's tag), control logic 22A may cause the operand to be written back to memory before loading the new block operand into the block storage location. As part of loading the new block operand into the block storage location, control logic 22A may update that block storage location's tag to identify the new operand.

Once the specified block operand is present in the cache accumulator, control logic 22A may provide that operand from the cache accumulator (e.g., to functional unit 25) so that the operation specified in the instruction may be performed on the block operand. The block operand may be provided one word at a time, and words of the block result may be stored back into the accumulator memory at the same time as words of the block operand are being provided from the accumulator memory. If a dual-ported memory is being used as the accumulator memory (e.g., as shown in FIG. 9), the block result may overwrite the block operand. If the accumulator memory includes several independently-interfaced memory banks (e.g., as shown in FIG. 5), the block result may be stored into a block storage location in a memory bank other than the memory bank storing the block operand. In such an embodiment, the block storage location storing the result and the block storage location storing the block operand may be identified by the same tag in the associativity list.

FIGS. 13A–13D shows an example of the contents of one embodiment of an accumulator memory as an accumulation operation is performed. The accumulation operation D=A XOR B XOR C is implemented by a series of instructions: Write_Allocate(A), XOR_Write(A,B,D), XOR_Write(D,C,D), and Read_Deallocate(D). As each instruction is performed, various fields (including a modified field "M" and a valid field "V") in the tag corresponding to the block storage location may be updated to reflect the current state of that block storage location. Note that the particular names and functions of the instructions are merely exemplary and other instruction formats and/or functions may be used in other embodiments.

Figure 13A:
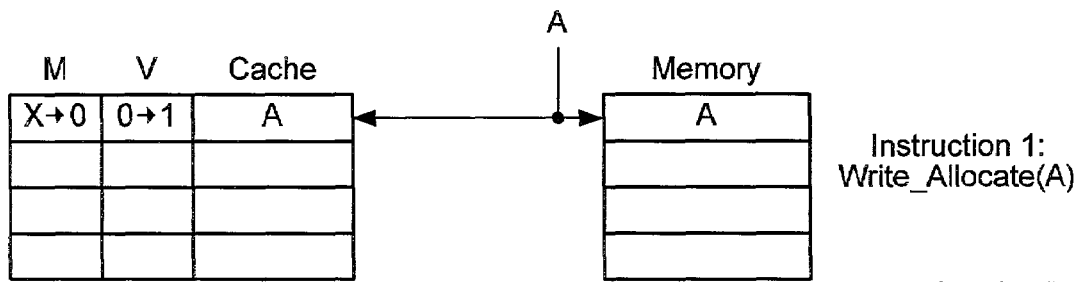
FIGS. 13A–13D illustrate an example of how one embodiment of a cache accumulator may behave in response to a series of instructions.

In FIG. 13A, the first instruction, Write_Allocate(A), causes a block storage location in the cache accumulator to be allocated to this accumulation operation and operand A to be stored in the allocated block storage location. In this example, all of the block storage locations are invalid before the first instruction is received, so the block operand A may be loaded into any of the block storage locations. As operand A is loaded into one of the block storage locations, the tag for that block storage location may be updated to identify which operand it is associated with (e.g., by updating the tag for that block storage location to indicate all or part of A's address in memory). Also, the modified and valid tag fields may be updated to indicate that the block storage location is not modified (i.e., it stores the same value for A that memory does) by setting "M"=0 and that the block storage location contains valid data by setting "V"=1. As this example illustrates, the value of A may be provided from memory or from another source (e.g., a device coupled to a bus, as shown in FIG. 9). If the value of A is not already stored in memory, it may be loaded into memory as it is loaded into cache accumulator. In embodiments where a copy of A is maintained in memory, the value of A may be used to re-execute this instruction if an error occurs during the performance of the accumulation operation.

Figure 13B:
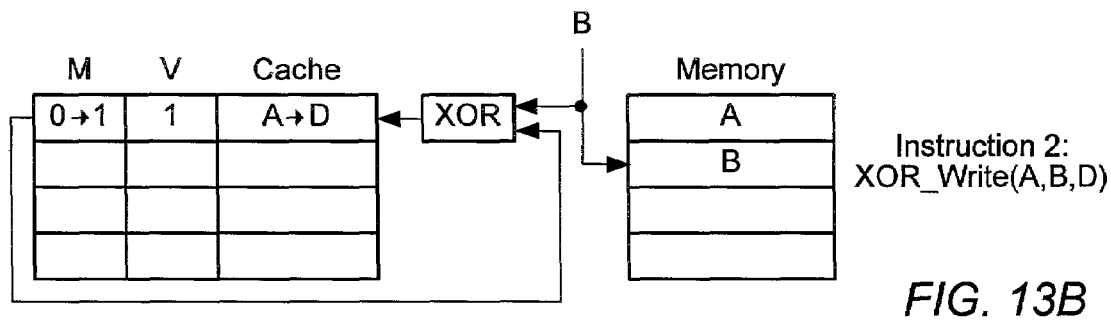

As shown in FIG. 13B, the next instruction, XOR_Write (A,B,D), causes the cache accumulator to determine whether operand A is present in the cache accumulator. Since A is present and valid, the cache accumulator outputs operand A to the functional unit performing the XOR operation. Operand B is also provided to the functional unit by an external data bus. Operand B may be provided from memory or from an external source. If operand B is provided from an external source, a copy of B may be stored in memory as it is being provided to the functional unit.

The cache accumulator is configured to store the result of each instruction in the same block storage location (or set of block storage locations) allocated to the operand used to produce that result. Thus, the result D may be stored into the same block storage location that originally stored operand A. Accordingly, the tags for that block storage location may be updated to indicate that operand D is stored within (e.g., by changing the tag to identify all or some of operand D's address instead of operand A's address). Additionally, the "M" field may be updated to indicate that operand D is modified (i.e., the copy of operand D in the cache accumulator modified with respect to a copy of D in memory).

Figure 13C:
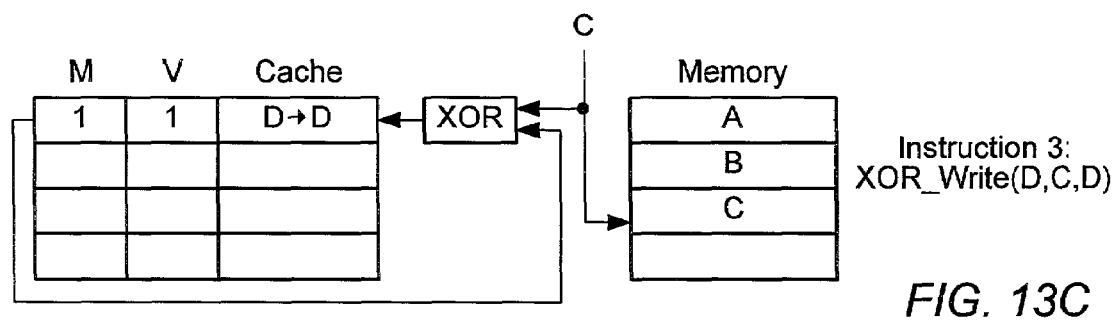

FIG. 13C shows how the third instruction, XOR_Write (D,C,D), causes the cache accumulator to determine whether D is present in the cache accumulator using the tags associated with each block storage location. Since D is present and valid, as indicated by the tag values, the cache accumulator provides D to the functional unit to be XORed with C. C may be stored in memory as it is being provided to the functional unit. In other embodiments, C may already be stored in memory. In those embodiments, C may be provided to the functional unit from memory instead of from an external source. The result D from the functional unit is stored in the same block storage location in the cache accumulator as operand D. The tags for that block storage location may continue to indicate that operand D is stored within and that operand D is valid and modified.

Figure 13D:
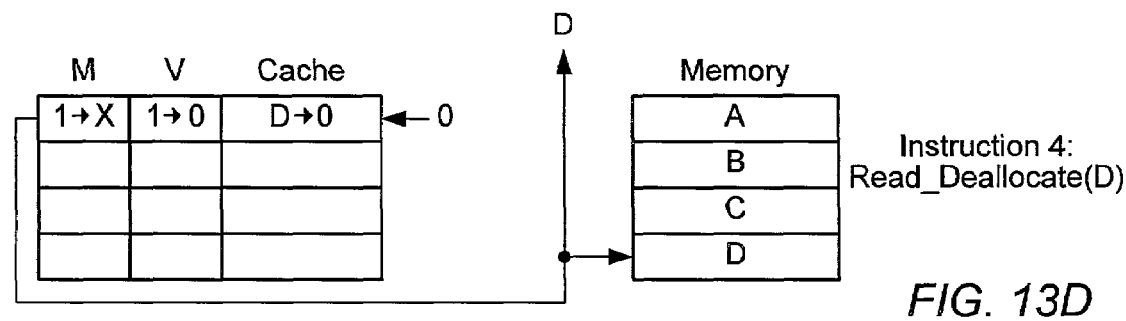

In FIG. 13D, the final instruction in this accumulation operation, Read_Deallocate(D), causes the result of the accumulation operation to be stored in memory and/or provided to an external device and the block storage location currently storing D to be deallocated. Such an instruction may cause memory to provide a copy of operand D to an external device if D misses in the cache accumulator.

Note that some embodiments may not actually implement an instruction that deallocates D. Instead, a read instruction may cause D to be provided from the cache accumulator to memory and/or an external device and cause the cache accumulator to modify the tag associated with D. For example, if the read instruction causes a copy of D to be stored in memory, D's tag may be updated to indicate that D is no longer modified (since the copies of D in the cache accumulator and the memory are now coherent). If an instruction encountered prior to a cache flush or a read instruction that accesses D causes D's block storage location to be overwritten, the modified indication in D's tag will cause D to be copied back to memory before it is overwritten. Alternatively, the read instruction may cause a copy of D to be provided to an external device and have no effect on D's tag. If the cache accumulator is flushed or if D's block storage location is overwritten (e.g., because D's block storage location becomes the LRU block storage location in the cache accumulator), the modified indication in the tag will cause D to be written back to memory.

Figure 14A:
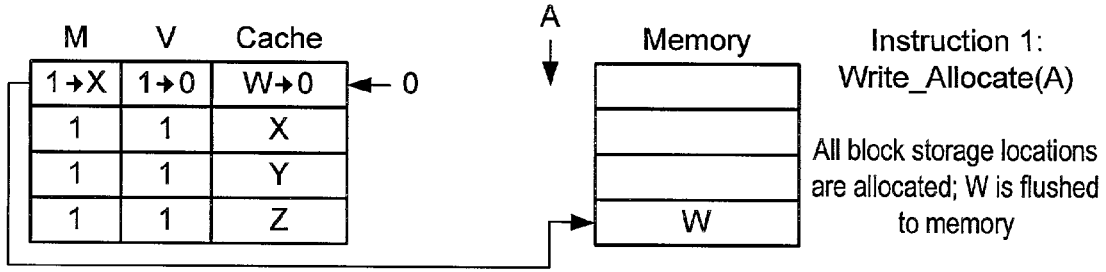
FIGS. 14A–14E show another example of an embodiment of a cache accumulator responding to a series of instructions.
Figure 14B:
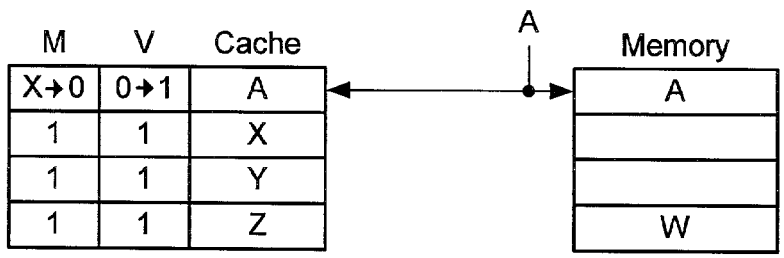

FIGS. 14A–14E and 15A–15F show other examples of how one embodiment of a cache accumulator may behave in response to a series of instructions. These examples illustrate how an operand may be flushed to memory and loaded back into the cache accumulator at various points during an accumulation operation. In FIG. 14A, all of the block storage locations in the cache accumulator are allocated when the new accumulation operation (D=A XOR B XOR C) begins. Operand W is selected for replacement and, since its tag indicates that is modified ("M"=1), operand W is copied back to memory. Once a block storage location becomes available, that block storage location may be allocated to the new accumulation operation by setting its tag to indicate that it contains valid data and that the current value stored in that block storage location is operand A, as shown in FIG. 14B.

Figure 14C:
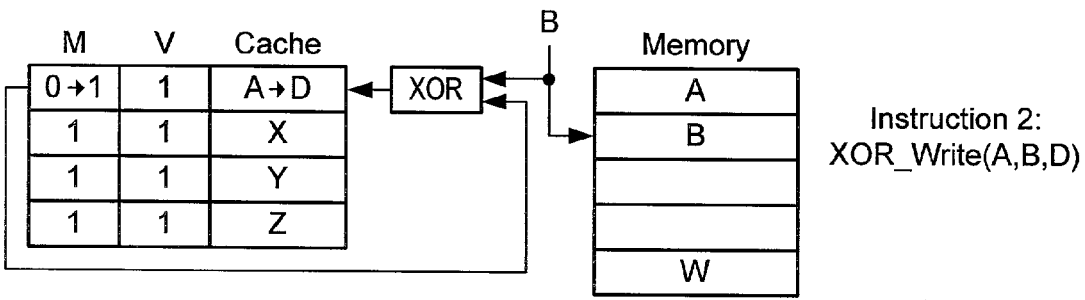

FIG. 14C illustrates how A may be provided to the functional unit. The functional unit performs an XOR operation on A and B to generate result D. D is stored in the same block storage location that held A and the tags are updated to indicate that the block storage location now stores D and that data stored in the block storage location is modified.

Figure 14D:
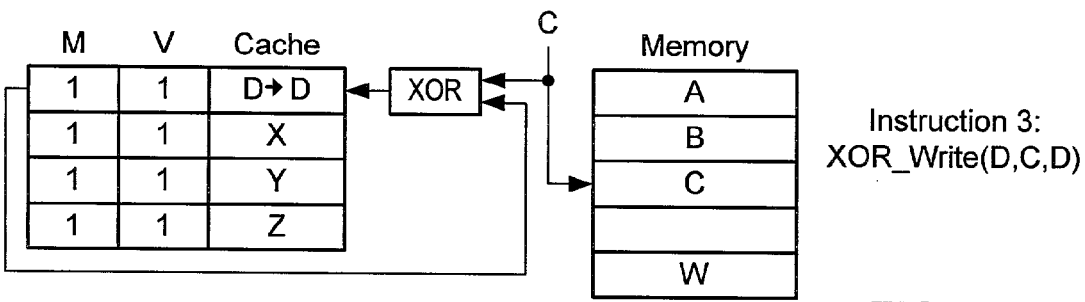
Figure 14E:
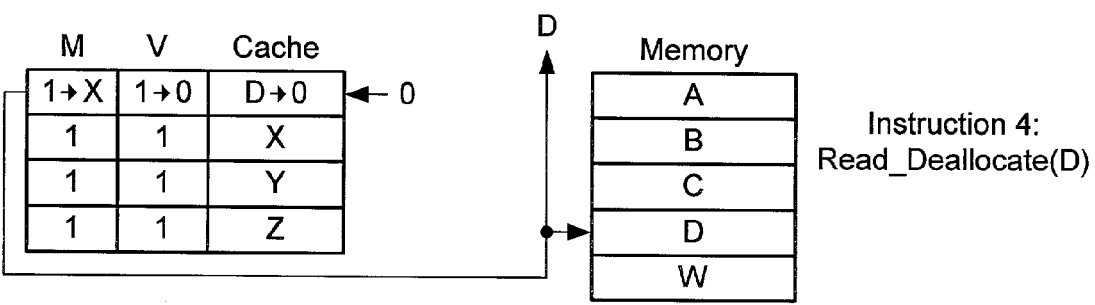

FIG. 14D shows how operand D (the result of the previous instruction) may be provided from the cache accumulator to the functional unit along with operand C. The result D is stored in the same block storage location in the cache accumulator. In FIG. 14E, the Read_Deallocate(D) instruction causes the cache accumulator to write D back to memory and invalidates the block storage location that was allocated to D.

Figure 15A:
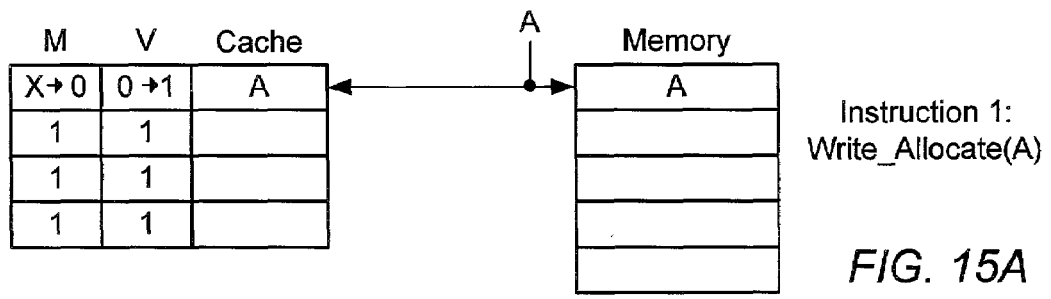
FIGS. 15A–15F show yet another example of an embodiment of a cache accumulator responding to a series of instructions.
Figure 15B:
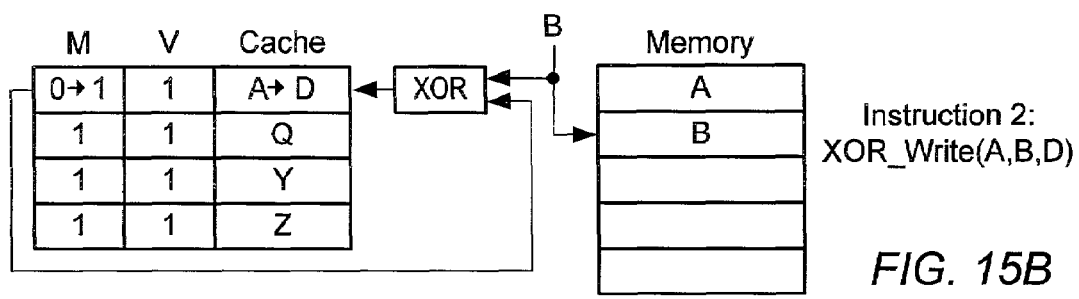
Figure 15C:
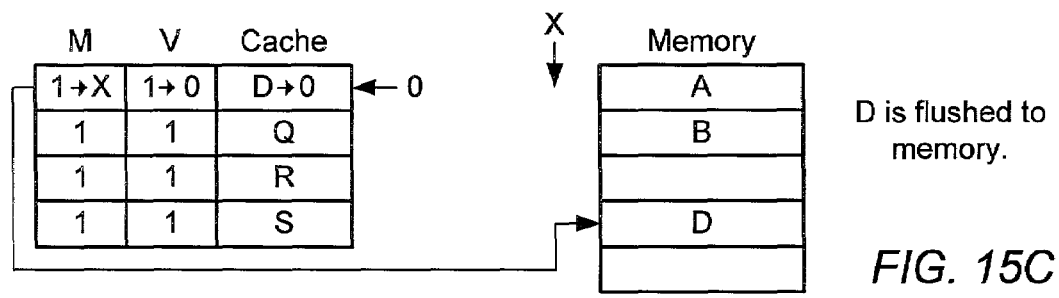
Figure 15D:
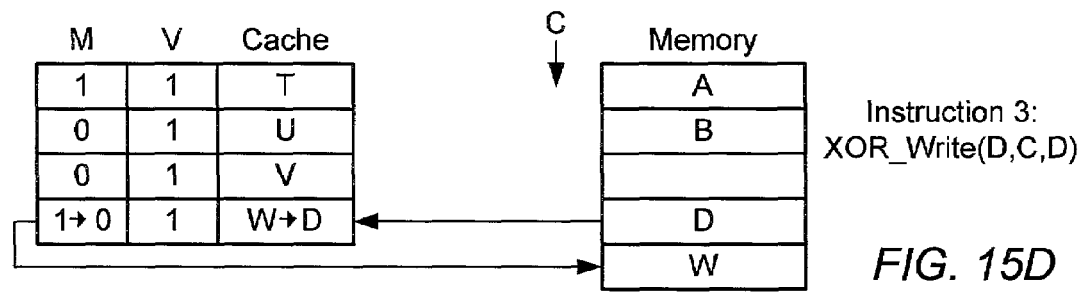
Figure 15E:
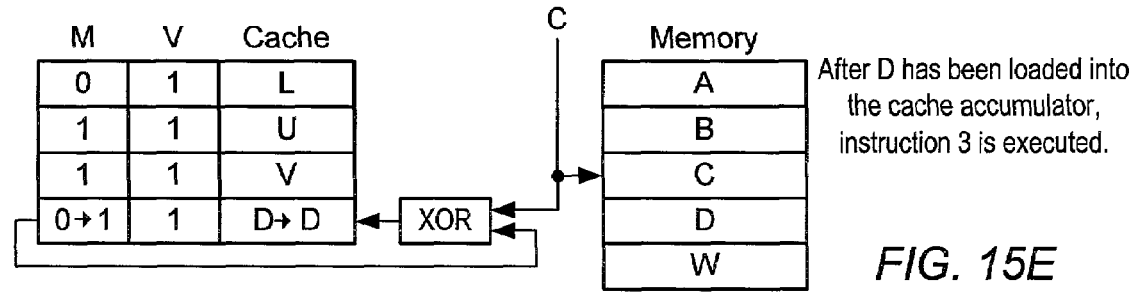
Figure 15F:
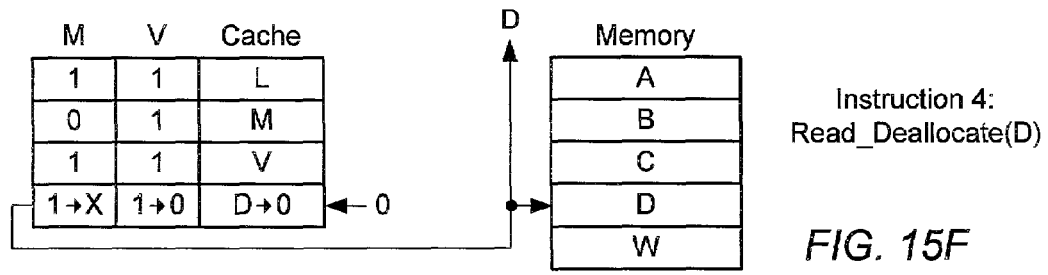

In the example of FIGS. 15A–15F, the same accumulation operation shown in FIGS. 13A–13D may be performed. FIGS. 15A and 15B are similar to FIGS. 13A and 13B. However, FIG. 15C shows how operand D is flushed from the cache accumulator before the instruction XOR_Write(D, C,D) is received. This may occur if operand C is fetched from disk. During the time when C is being retrieved from disk, the data in the block storage location allocated to operand D may be flushed to memory (e.g., because that block storage location became the least recently used block storage location during the time period in which C is being fetched from disk) so that an accumulation operation whose operands are currently available can execute. Once operand C becomes available, instruction XOR_Write(D,C,D) may be provided to control logic 22A, as shown in FIG. 15D. However, when that instruction is received, operand D misses in the cache accumulator. As a result, D must be loaded into the accumulator memory from memory before the instruction can be executed. Furthermore, since all of the block storage locations are currently allocated, the block storage location storing operand W (e.g., the least recently used block storage location) is selected for replacement. Since that block storage location's tags indicate that W is modified ("M"=1), W is copied back to memory as D is loaded into the cache. The block storage location's tags are then updated to indicate that it contains D, that D is valid, and that D is not modified. The operation may then complete, as shown in FIGS. 15E and 15F.

FIGS. 16A–16D shows another example of how another embodiment of a cache accumulator may behave in response to the series of instructions shown in FIGS. 13A–13D. In this example, the cache accumulator includes several independently interfaced memory banks (e.g., as shown in FIGS. 5 and 12A). Each tag may correspond to a pair of block storage locations. Each pair of block storage locations may include one block storage location from each memory bank, and the tag for each pair may include an additional field "B" indicating which block storage location within the pair currently stores the most recently updated operand (e.g., by indicating which memory bank 0 or 1 currently stores the most recently updated operand). Note that in an alternative embodiment, each block storage location in each independently interface memory bank may have its own tag (as opposed to having a tag that corresponds to a pair of block storage locations).

Figure 16A:
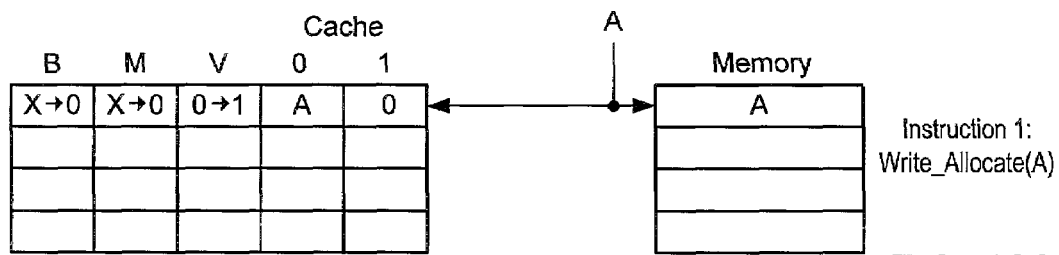
FIGS. 16A–16D illustrate an example of how another embodiment of a cache accumulator may behave in response to a series of instructions.
Figure 16B:
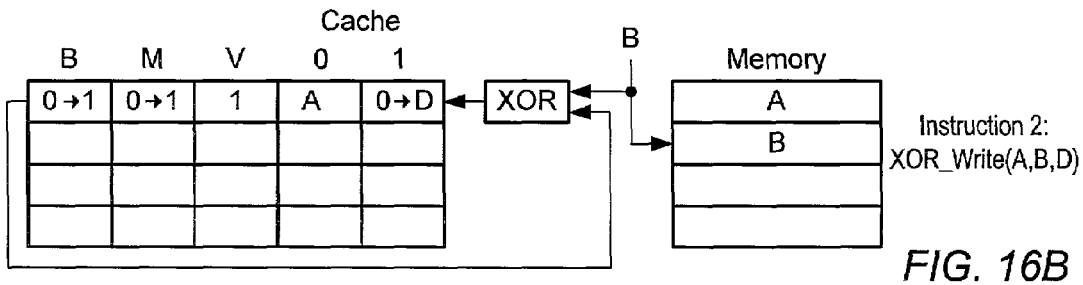
Figure 16C:
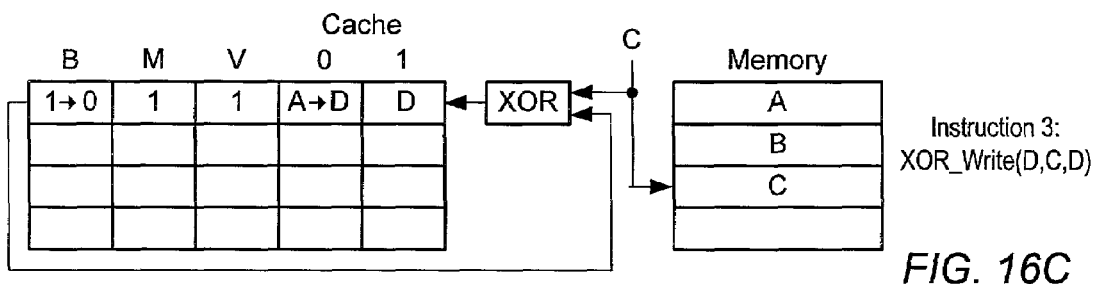
Figure 16D:
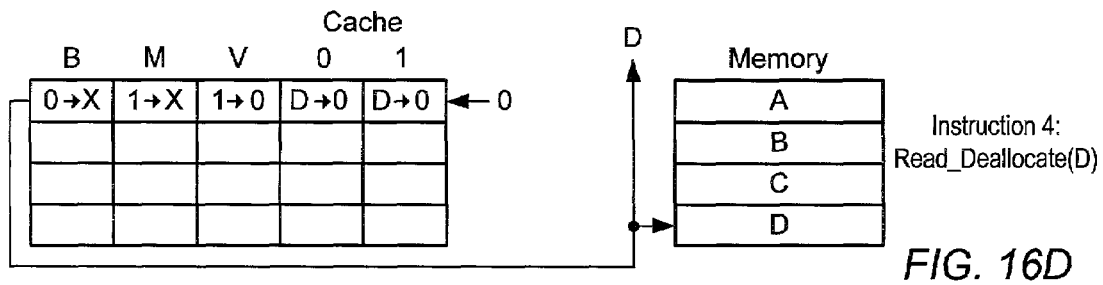

In this example, the cache accumulator performs each instruction in much the same way as shown in FIGS. 13A–13D. In this embodiment, however, the cache accumulator also tracks which memory bank is storing the most recent value in the accumulation operation. Thus, FIG. 16A shows how, in response to the first instruction, the cache accumulator updates the tag for the pair of block storage locations allocated to this accumulation operation to indicate that operand A is stored in memory bank 0. As shown in FIG. 16B, when the result of the next instruction is stored in memory bank 1, the tag for that pair of block storage locations is updated to indicate that the most recent value is stored in memory bank 1. Similarly, in FIG. 16C, the tag is updated to indicate that memory bank 0 stores the most recent value. In FIG. 16D, the accumulation operation completes when the current value of D is written back to memory and the data in the block storage locations allocated to the accumulation operation is invalidated.

Figure 17:
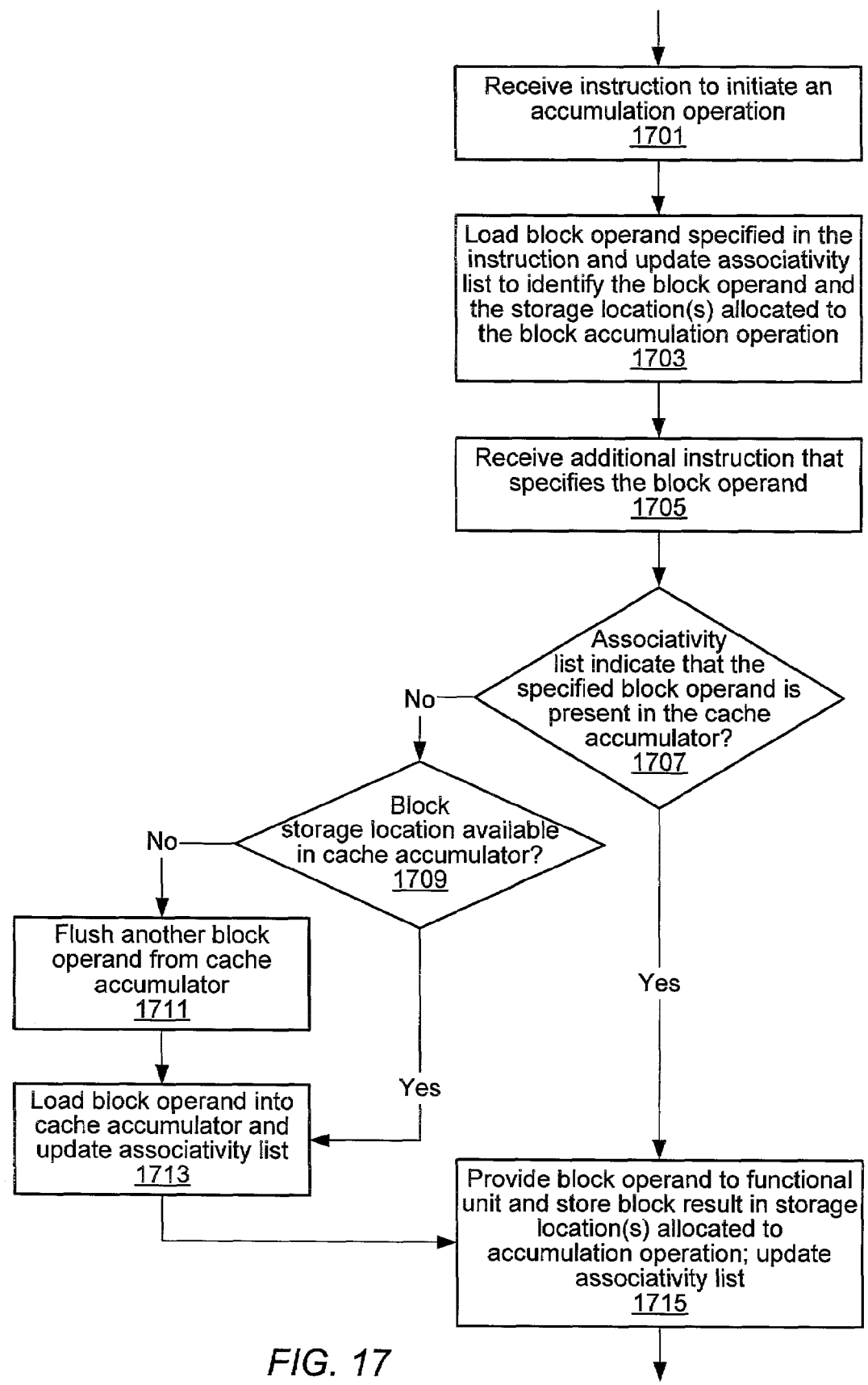
FIG. 17 is a flowchart illustrating one embodiment of a method of using a cache accumulator that includes an associativity list.

FIG. 17 is a flowchart of one embodiment of a method of using an associativity list associated with a cache accumulator to perform a series of instructions in a block accumulation operation. At 1701, the cache accumulator receives an instruction to initiate an accumulation operation by loading an operand from memory into the cache accumulator. In response to the instruction, the cache accumulator loads the specified block operand and updates the associativity list to identify the block operand and the storage location(s) allocated to the accumulation operation, as shown at 1703.

At 1705, an additional instruction is received that specifies the block operand. In this example, this instruction is an instruction to perform an operation on the block operand and to store the result. At 1707, the cache accumulator may check the associativity list to determine whether the specified operand is stored in the cache accumulator. If the specified operand is not stored in the cache accumulator, the cache accumulator may determine whether a block storage location is available in which to store the operand, as shown at 1709. If all of the block storage locations are allocated, the cache accumulator may flush another block operand from the cache accumulator, as shown at 1711. When a block storage location is available to store the specified block operand, the cache accumulator may load the block operand specified at 1705 into the block storage location, as shown at 1713. The cache accumulator also updates the associativity list to indicate which block storage location(s) have been allocated to the accumulation operation and to identify the block operand currently stored in the allocated block storage location(s).

Once the specified block operand is present in the cache accumulator, the cache accumulator may provide the block operand to a functional unit and store the block result in the same block storage location(s) allocated to the accumulation operation, as identified by the associativity list, as shown at 1715. For example, if the associativity list indicates that a single block storage location is associated with the operand, the cache accumulator may store the result in that storage location, overwriting the operand. If multiple block storage locations were allocated (e.g., if a pair of block storage locations was allocated, as shown in FIG. 16), the cache accumulator may store the result into one of the allocated block storage locations. If the address of the result is different than the address of the operand, the cache accumulator may also update the associativity list to indicate that the result is associated with the allocated block storage location(s).

Numerous variations and modifications will become apparent to those skilled in the art once the above disclosure is fully appreciated. It is intended that the following claims be interpreted to embrace all such variations and modifications.

What is claimed is:

1. A system, comprising:
   a storage array including a plurality of mass storage devices;
   an array controller configured to perform block operations on data stored to the storage array, wherein the array controller includes a memory configured to provide an addressable block operand storage space and to store within the block operand storage space block operands received from one or more of said plurality of mass storage devices; and a cache accumulator memory comprising a plurality of block storage locations and a functional unit configured to perform a block operation on one or more block operands to generate a block result;
   wherein the plurality of block storage locations of the cache accumulator memory are configured to cache a portion of the block operand storage space of the memory;
   wherein in response to an instruction using an address in the memory to identify a first block operand, the cache accumulator memory is configured to:
      determine whether the first block operand is stored among the plurality of block storage locations of the cache accumulator memory;
      in response to determining that the first block operand is stored among the plurality of block storage locations of the cache accumulator memory, output the first block operand from the plurality of block storage locations to the functional unit; and
      in response to determining that the first block operand is not stored among the plurality of block storage locations of the cache accumulator memory, initiate a fetch operation to fetch the first block operand from the memory, and upon receiving the first block operand from the memory, store the first block operand within the plurality of block storage locations of the cache accumulator memory;
   wherein the plurality of block storage locations of the cache accumulator memory are further configured to accumulate an intermediate result of a block accumulation operation performed on the first block operand, wherein the intermediate result is both a result of and an operand of the block accumulation operation, such that during the block accumulation operation, the plurality of block storage locations of the cache accumulator memory are concurrently configured both to cache certain ones of the block operands and to accumulate the intermediate result of the block accumulation operation.

2. The system of claim 1, wherein the cache accumulator memory comprises a dual-ported memory.

3. The system of claim 1, wherein the cache accumulator memory comprises at least two independently interfaced memory banks, wherein the cache accumulator memory is configured to provide the block operand from a first one of the independently interfaced memory banks and to store the block result in a second one of the independently interfaced memory banks.

4. The system of claim 1, wherein the cache accumulator memory is configured to indicate whether a particular block operand stored in the cache accumulator memory is modified with respect to a copy of that particular block operand in the memory.

5. The system of claim 1, wherein the cache accumulator memory is configured to load a copy of the block operand into the cache accumulator memory from the memory in response to the block operand not being present in the cache accumulator memory when the instruction is received.

6. The system of claim 5, wherein the cache accumulator memory comprises a plurality of block storage locations, wherein if all of the block storage locations are currently storing valid data, the cache accumulator memory is configured to select one of the block storage locations to overwrite with the copy of the block operand and to load the copy of the block operand into the selected one of the block storage locations.

7. The system of claim 6, wherein the cache accumulator memory is configured to use a least recently used algorithm to select the one of the block storage locations to overwrite.

8. The system of claim 6, wherein if data in the selected one of the block storage locations is modified with respect to a copy of that data in the memory, the cache accumulator memory is configured to write the data back to the memory before loading the copy of the block operand into the selected one of the block storage locations.

9. The system of claim 1, wherein the functional unit is configured to perform a parity calculation on the block operand.

10. The system of claim 1, wherein the functional unit is configured to calculate a parity block from a plurality of data blocks in a stripe of data, wherein the first block operand is a first one of the data blocks in the stripe of data.

11. The system of claim 1, wherein the functional unit is configured to perform the block operation on two block-operands.

12. The system of claim 11, wherein a first of the two block-operands is the first block operand stored in the cache accumulator memory and a second of the two block-operands is provided on a data bus coupled to provide operands to the functional unit.

13. The system of claim 11, wherein a first of the two block-operands is the first block operand stored in the cache accumulator memory and a second of the two block-operands is provided from the memory to the functional unit.

14. The system of claim 1, wherein the cache accumulator memory is configured to provide a word of the first block operand to the functional unit during an access cycle in which the cache accumulator memory also stores a word of the block result generated by the functional unit.

15. A method of performing a block accumulation operation, the method comprising:
  storing data to a storage array including a plurality of mass storage devices;
  receiving a first command to perform a block accumulation operation on a first block operand identified by a first address in a memory, wherein the first block operand corresponds to data stored to the storage array, and wherein the memory is configured to provide an addressable block operand storage space and to store within the block operand storage space block operands received from one or more of said plurality of mass storage devices;
  in response to receiving the first command:
    determining whether the first block operand is stored among a plurality of block storage locations of a cache accumulator memory, wherein the plurality of block storage locations are configured to cache a portion of the block operand storage space of the memory;
    loading the first block operand from the memory into one of the plurality of block storage locations included in the cache accumulator memory in response to determining that the first block operand is not stored in the cache accumulator memory;
    in response to determining that the first block operand is stored in the cache accumulator memory, providing the first block operand from the plurality of block storage locations of the cache accumulator memory to a functional unit; and
    accumulating a block result of the block accumulation operation generated by the functional unit into the plurality of block storage locations, wherein the block result is both a result of and an operand of the block accumulation operation, such that during the block accumulation operation, the plurality of block storage locations of the cache accumulator memory are concurrently configured both to cache certain ones of the block operands and to accumulate the intermediate result of the block accumulation operation.

16. The method of claim 15, wherein said providing comprises providing successive words of the first block operand and wherein said accumulating comprises storing successive words of the block result, wherein a word of the first block operand is provided from the cache accumulator memory to the functional unit during an access cycle in which a word of the block result is stored in the cache accumulator memory.

17. The method of claim 15, wherein the cache accumulator memory comprises a dual-ported memory, wherein said accumulating comprises overwriting the first block operand with the block result.

18. The method of claim 15, wherein the cache accumulator memory comprises at least two independently interfaced memory banks, wherein said loading comprises loading the first block operand into a first one of the independently interfaced memory banks and wherein said accumulating comprises storing the block result in a second one of the independently interfaced memory banks.

19. The method of claim 15, wherein the cache accumulator memory comprises a plurality of block storage locations, wherein if all of the block storage locations are currently storing valid data when the first command is received, said loading comprises selecting one of the block storage locations to overwrite with the copy of the first block operand and loading the copy of the first block operand into the selected one of the block storage locations.

20. The method of claim 19, wherein said selecting comprises using a least recently used algorithm to select the one of the block storage locations to overwrite.

21. The method of claim 19, further comprising writing data in the selected one of the block storage locations back to the memory if the data is modified with respect to a copy of that data in the memory.

22. The method of claim 15, further comprising the functional unit performing a parity calculation on the first block operand to generate the block result in response to said providing.

23. The method of claim 15, wherein the operation comprises a parity calculation, and wherein the command is issued by an array controller configured to perform block operations on data stored to the storage array.

24. The method of claim 15, further comprising the functional unit performing the operation on the first block operand and a second block operand in response to said providing.

25. The method of claim 24, further comprising a data bus providing the second block operand to the functional unit.

26. A data processing system, comprising:
  a host computer system;
  a storage array;
  an interconnect coupled to the host computer system and the storage array and configured to transfer data between the host computer system and the storage array; and
  a parity calculation system configured to perform parity operations on data stored to the storage array, wherein the parity calculation system comprises a memory configured to provide an addressable block operand storage space and to store within the block operand storage space block operands received from the storage array, a cache accumulator memory comprising a plurality of block storage locations, and a parity calculation unit;
  wherein in response to an instruction using an address in the memory to identify the first block operand, the cache accumulator memory is configured to:
    determine whether the first block operand is stored among the plurality of block storage locations of the cache accumulator memory;
    in response to determining that the first block operand is stored among the plurality of block storage locations of the cache accumulator memory, output the first block operand from the plurality of block storage locations to the parity calculation unit and subsequently store a first block result generated by the parity calculation unit within the plurality of block storage locations of the cache accumulator memory;
    in response to determining that the first block operand is not stored among the plurality of block storage locations of the cache accumulator memory, initiate a fetch operation to fetch the first block operand from the memory, and upon receiving the first block operand from the memory, store the first block operand within the plurality of block storage locations of the cache accumulator memory;

wherein the plurality of block storage locations of the cache accumulator memory are configured to cache a portion of the block operand storage space of the memory and to accumulate an intermediate result of a block accumulation operation performed on a given block operand, wherein the intermediate result is both a result of and an operand of the block accumulation operation, such that during the block accumulation operation, the plurality of block storage locations of the cache accumulator memory are concurrently configured both to cache certain ones of the block operands and to accumulate the intermediate result of the block accumulation operation.

27. The data processing system of claim 26, wherein the parity calculation unit is configured to perform a parity calculation on the first block operand provided by the cache accumulator memory and a second block operand provided on a data bus.

28. The data processing system of claim 27, wherein the parity calculation system is configured to calculate a parity block from a plurality of data blocks in a stripe of data, wherein the first block operand is a first one of the data blocks in the stripe of data and wherein the second block operand is a second one of the data blocks in the stripe of data.

29. The data processing system of claim 26, wherein the cache accumulator memory is configured to store a word of the first block result during an access cycle in which the cache accumulator memory provides a word of the first block operand to the parity calculation unit.

30. An apparatus, comprising:
storage array means configured for storing data; and
means for performing block operations on data stored to the storage array means, wherein the means for performing block operations is configured to generate block results; and
means for accumulating block results generated by the means for performing block operations, wherein the means for accumulating block results is coupled to the means for performing block operations and comprises a plurality of block storage locations configured to cache a portion of an addressable block operand storage space of a memory configured to store within the block operand storage space block operands received from the storage array means;

wherein in response to an instruction that uses an address in the memory to identify a first block operand within the addressable block operand storage space, the means for accumulating block results is further configured to:
determine whether the first block operand is stored among the plurality of block storage locations of the means for accumulating block results;
in response to determining that the first block operand is stored among the plurality of block storage locations of the means for accumulating block results, provide the first block operand to the means for performing a first block operation;
in response to determining that the first block operand is not stored among the plurality of block storage locations of the means for accumulating block results, initiate a fetch operation to fetch the first block operand from the memory, and upon receiving the first block operand from the memory, store the first block operand within the plurality of block storage locations of the means for accumulating block results;

wherein the plurality of block storage locations of the means for accumulating block results are configured to accumulate an intermediate result of a block accumulation operation performed on the first block operand, wherein the intermediate result is both a result of and an operand of the block accumulation operation, such that during the block accumulation operation, the plurality of block storage locations of the means for accumulating block results are concurrently configured both to cache certain ones of the block operands and to accumulate the intermediate result of the block accumulation operation.

* * * * *